US005887061A

United States Patent [19]

Sato

[11] Patent Number: 5,887,061

[45] Date of Patent: Mar. 23, 1999

[54] COMPRESSION CODING DEVICE WITH SCRAMBLING FUNCTION AND EXPANSION REPRODUCING DEVICE WITH DESCRAMBLING FUNCTION

[75] Inventor: Hideaki Sato, Tokyo, Japan

[73] Assignee: Oki Electric Industry Co., Ltd., Tokyo, Japan

[21] Appl. No.: 825,461

[22] Filed: Mar. 28, 1997

[30] Foreign Application Priority Data

May 1, 1996 [JP] Japan .................................... 8-110743

[51] Int. Cl.[6] ..................................................... H04N 7/167

[52] U.S. Cl. .................................... 380/14; 380/9; 380/49

[58] Field of Search .................................... 380/14, 9, 49, 380/4, 20

[56] References Cited

U.S. PATENT DOCUMENTS

| | | | |
|---|---|---|---|
| 4,691,352 | 9/1987 | Arragon et al. | 380/14 |
| 4,742,544 | 5/1988 | Kupnicki et al. | 380/14 |
| 4,757,531 | 7/1988 | Lodge et al. | 380/14 |
| 4,945,564 | 7/1990 | Christian et al. | 380/14 |
| 5,208,857 | 5/1993 | Lebrat | 380/14 |
| 5,319,707 | 6/1994 | Wasilewski et al. | 380/14 |
| 5,553,141 | 9/1996 | Lowry et al. | 380/14 |
| 5,555,305 | 9/1996 | Robinson et al. | 380/14 |

*Primary Examiner*—David Cain
*Attorney, Agent, or Firm*—Rabin & Champagne P.C.

[57] ABSTRACT

In a compression coding device having a scrambling function, a variable length coder outputs coded image data. When the image data are to be written to a memory included in a multiplexer, a controller generates a control signal for writing the image data in the order of the positions of slices constituting a single picture, and feeds it to the memory. When the image data should be scrambled on the basis of a preselected scrambling system, the controller outputs a control signal for reading the image data out of the memory in a different order with respect to the positions of slices, and feeds it to the memory. The multiplexer multiplexes the image data in a preselected position of an MPEG (Moving Picture Experts Group) 2 output data format. Further, the controller outputs information representative of the positions of the slices occurred before and after the scrambling, and causes the multiplexer to multiplex them in another preselected position of the MPEG2 output data format. An expansion reproducing device having a descrambling function is also disclosed.

24 Claims, 46 Drawing Sheets

*FIG.13A* ORDER OF INPUT PICTURES (ORIGINAL IMAGE)

*FIG.13B* CODING ORDER

*FIG.13C* INPUT/OUTPUT ORDER FROM TRANSMITTER/RECEIVER

*FIG.13D* DECODING ORDER

*FIG.13E* ORDER OF REPRODUCTION (REPRODUCER IMAGE)

| |
|---|
| A |
| B |
| C |
| D |
| E |
| F |
| G |
| H |

*FIG.15*

| |
|---|
| C |
| B |
| D |
| A |
| E |
| H |
| G |
| F |

*FIG.16*

FIG.20
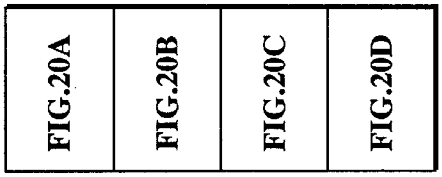
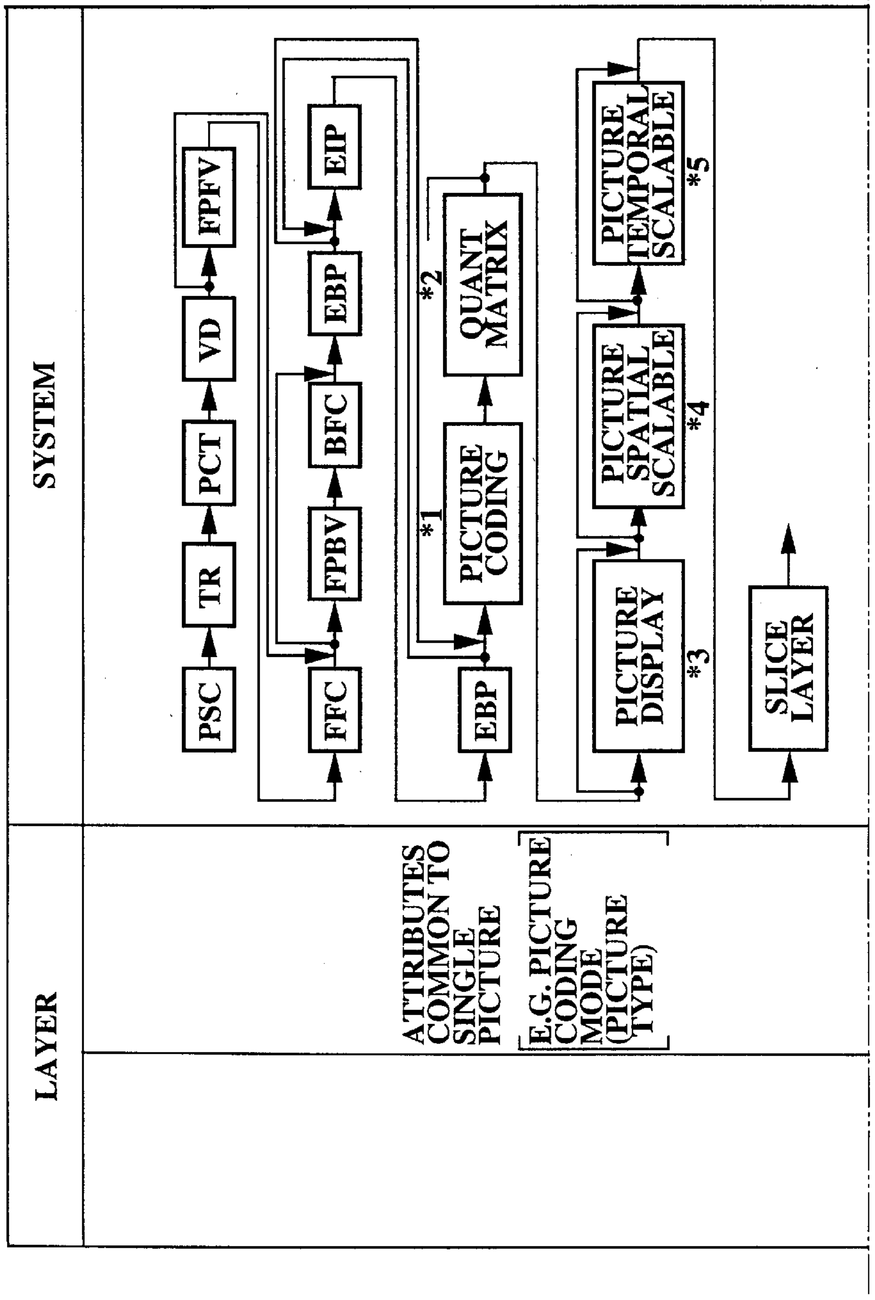
FIG.20A

FIG.21
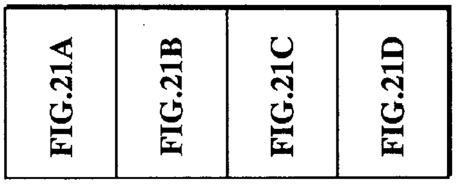
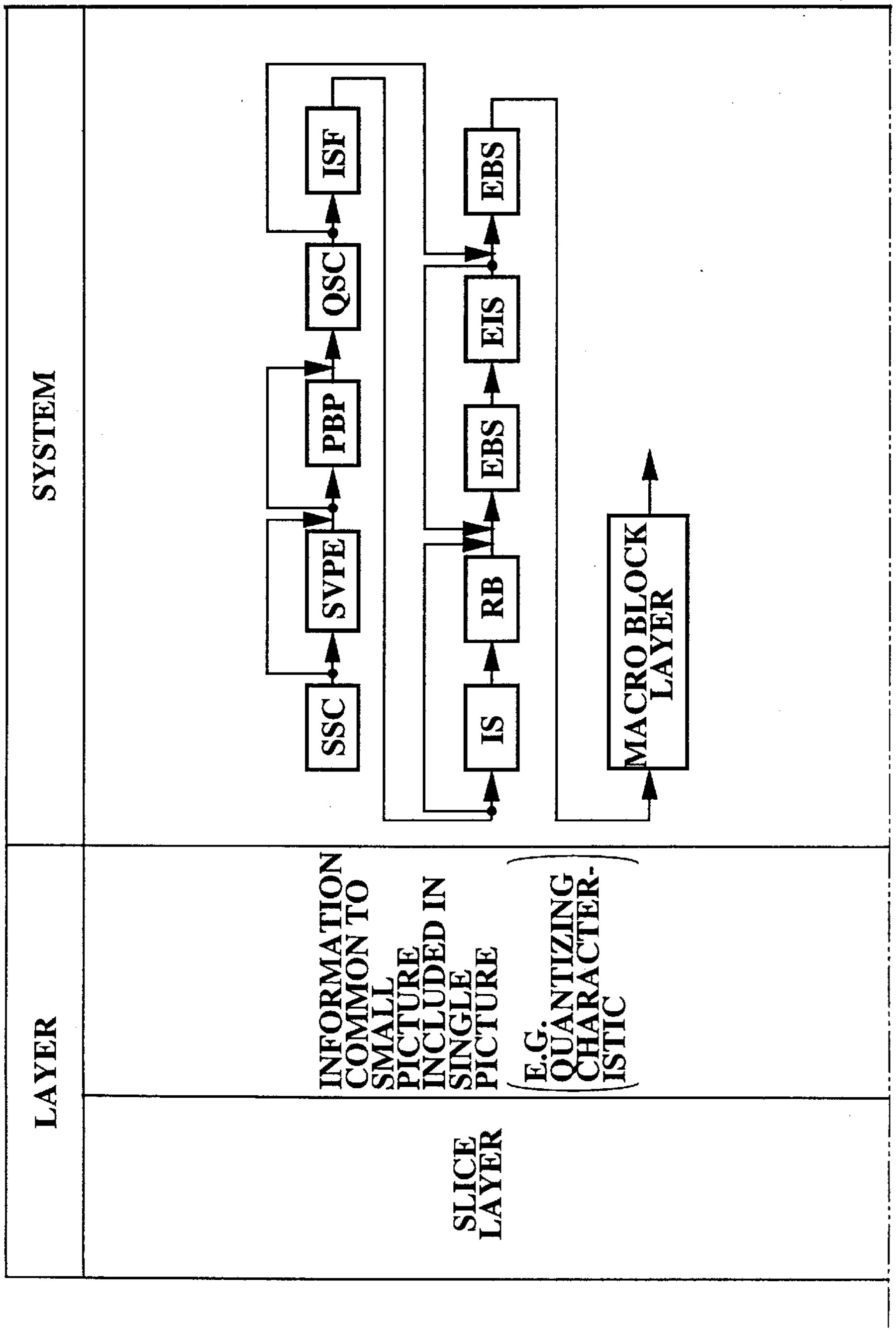
FIG.21A

FIG.22

| FIG.22A |
|---|
| FIG.22B |
| FIG.22C |

| LAYER | ABBREV. | CONTENT IN ENGLISH | BIT LENGTH | NOTE |
|---|---|---|---|---|
| | SHC | SEQUENCE HEADER CODE | 32 | SEQUENCE LAYER START SYNC CODE |
| | HSV | HORIZONTAL SIZE VALUE | 12 | LOWER 12 BITS OF HORIZONTAL NUMBER OF PIXELS IMAGE |
| | VSV | VARTICAL SIZE VALUE | 12 | LIWER 12 BITS OF VERTICAL NUMBER OF PIXELS IMAGE |
| | ARI | ASPECT RATIO INFORMATION | 4 | ASPECT RATIO (V/H RATIO) OF PIXEL OR OF PICTURE |
| | FRC | FRAME RATE CODE | 4 | IMAGE DISPLAY PERIOD |
| | BRV | BIT RATE VALUE | 18 | RAISE TO UNIT BASED ON LOWER 18 BITS, 400 BPS OF BIT RATE FOR LIMITING AMOUNT OF BITS |
| | MRK | MARKER BIT | 1 | BIT TO AVOID START CODE EMULATION |
| | VBSV | VBV BUFFER SIZE VALUE | 10 | LOWER 10 BITS OF VALUE DETERMINING SIZE OF VIRTUAL BUFFER (VBV) FOR AMOUNT OF CODE CONTROL |

FIG.22A

| | | | | |
|---|---|---|---|---|
| SEQUENCE LAYER | CPF | CONSTRAINED PARAMETER FLAG | 1 | SHOWING THAT EACH PARAMETER IS WITHIN LIMIT |
| | LIQM | LOAD INTRA QUANTIZER MATRIX | 1 | PRESENCE OF QUANTIZER MATRIX DATA FOR INTRA MB |
| | IQM | INTRA QUANTIZER MATRIX | 8X64 | VALUE OF QUANTIZER MATRIX FOR INTRA MB |
| | LNIQM | LOAD NON INTRA QUANTIZER MATRIX | 1 | PRESENCE OF QUANTIZER MATRIX DATA FOR NON-INTRA MB |
| | NIQM | NON INTRA QUANTIZER MATRIX | 8X64 | VALUE OF QUANTIZER MATRIX FOR NON-INTRA MB |
| | ESC | EXTENSION START CODE | 32 | EXTENSION DATA START SYNC CODE |
| | UDSC | USER DATA START CODE | 32 | SYNC CODE SHOWING USER DATA START |
| | UD | USER DATA | 8Xn | USER DATA |
| | ESCI | EXTENSION START CODE IDENTIFIER | 4 | CODE SHOWING EXTENSION DATA TO BE SENT |

*FIG.22B*

| | | | | |
|---|---|---|---|---|
| | PALI | PROFILE AND LEVEL INDICATION | 8 | INDICATING PROFILE & LEVEL |
| | PS | PROGRESSIVE SEQUENCE | 1 | INDICATING SEQUENTIAL SCANNING |
| | CF | CHROMA FORMAT | 2 | INDICATING CHROMA FORMAT |
| | HSE | HORIZONTAL SIZE EXTENSION | 2 | UPPER 2 BITS TO BE ADDED TO HSV |
| | VSE | VERTICAL SIZE EXTENSION | 2 | UPPER 2 BITS TO BE ADDED TO VSV |
| | BRE | BIT RATE EXTENSION | 12 | 12 BITS TO BE ADDED TO BRV |
| | VBSE | BVB BUFFER SIZE EXTENSION | 8 | UPPER 8 BITS TO BE ADDED TO VBSV |
| | LD | LOW DELAY | 1 | SHOWING ABSENCE OF B PICTURE |

| FIG.23A |
| --- |
| FIG.23B |
| FIG.23C |

| LAYER | ABBREV. | CONTENT IN ENGLISH | BIT LENGTH | NOTE |
| --- | --- | --- | --- | --- |
| | FREn | FRAME RATE EXTENSION n | 2 | PRODUCING FRAME RATE IN COMBINATION WITH FRC |
| | FREd | FRAME RATE EXTENSION d | 2 | SAME AS ABOVE |
| | ESCI | EXTENSION START CODE IDENTIFIER | 4 | CODE SHOWING EXTENSION DATA TO BE SENT |
| | VF | VIDEO FORMAT | 3 | VIDEO FORMAT OF ORIGINAL SIGNAL |
| | CD | COLOR DESCRIPTION | 1 | PRESENCE OF DETAILED COLOR SPATIAL DESCRIPTION |
| | CP | COLOR PRIMARIES | 8 | DETAILS OF COLOR CHARACTERISTIC OF ORIGINAL SIGNAL |
| | TC | TRANSFER CHARACTERISTICS | 8 | DETAILS OF PHOTOELECTRIC TRANSDUCE |

FIG.23A

| | | | | |
|---|---|---|---|---|
| SEQUENCE LAYER | MXC | MATRIX COEFFIENTS | 8 | DETAILS OF TRANSFORM OF ORIGINAL SIGNAL FROM OPTICAL PRIMARY COLORS |
| | DHS | DISPLAY HORIZONTAL SIZE | 14 | INTENDED ACTIVE RANGE OF DISPLAY (HORIZONTAL SIZE) |
| | DVS | DISPLAY VERTICAL SIZE | 14 | INTENDED ACTIVE RANGE OF DISPLAY (VERTICAL SIZE) |
| | ESCI | EXTENSION START CODE IDENTIFIER | 4 | CODE SHOWING EXTENSION DATA TO BE SENT |
| | SM | SCALABLE MODE | 2 | INDICATING SCALABILITY MODE |
| | LID | LAYER ID | 4 | SHOWING BASIC LAYER/UPPER LAYER OF SCALABLE LAYER |
| | LLPHS | LOWER LAYER PREDICTION HORIZONTAL SIZE | 14 | HORIZONTAL SIZE OF LOWER LAYER FOR PREDICTION WITH SPATIAL SCALABILITY |
| | LLPVS | LOWER LAYER PREDICTION VERTICAL SIZE | 14 | VERTICAL SIZE OF LOWER LAYER FOR PREDICTION WITH SPATIAL SCALABILITY |

FIG.23B

| | | | | |
|---|---|---|---|---|
| | HSFm | HORIZONTAL SUB SAMPLING FACTOR m | 5 | USED FOR UP-SAMPLING FOR GENERATING PREDICTED IMAGE WITH SPATIAL SCALABILITY |
| | HSMn | HORIZONTAL SUB SAMPLING FACTOR n | 5 | SAME AS ABOVE |
| | HSFm | VERTICAL SUB SAMPLING FACTOR m | 5 | SAME AS ABOVE |
| | HSFn | VERTICAL SUB SAMPLING FACTOR n | 5 | SAME AS ABOVE |
| | PME | PICTURE MUX ENABLE | 1 | REMULTIPLICATION OF MULTIPLICATION ORDER OF PICTURE WITH TIME SCALABILITY BEFORE DISPLAY |
| | MTPS | MUX TO PROGRESSIVE SEQUENCE | 1 | TIME MULTIPLICATION OF PICTURE OF TWO LAYERS DECODED BY TIME SCALABILITY FOR SEQUENTIAL OPERATION SEQUENCE |
| | PMO | PICTURE MUX ORDER | 3 | ORDER FOR SYNTHESIZING DECODED PICTURE WITH TIME SCALABILITY |

| |
|---|
| FIG.24A |
| FIG.24B |
| FIG.24C |

| LAYER | ABBREV. | CONTENT IN ENGLISH | BIT LENGTH | NOTE |
|---|---|---|---|---|
| SEQUENCE LAYER | PMF | PICTURE MUX FACTOR | 3 | HOW DECODED PICTURE IS SYNTHESIZED BETWEEN BASIC LAYERS WITH TIME SCALABILITY |
| | SEC | SEQUENCE END CODE | 32 | END SYNC CODE OF PLURAL SEQUENCES |
| GOP LAYER | GSC | GROUP START CODE | 32 | GOP START SYNC CODE |
| | TC | TIME CODE | 25 | CODE SHOWING TIME FROM HEAD OF SEQUENCE |
| | CG | CLOSED GOP | 1 | FLAG SHOWING THAT PICTURES IN GOP CAN BE REPRODUCED INDEPENDENTLY OF OTHER GOPS |
| | BL | BROKEN LINK | 1 | FLAG SHOWING THAT LEADING B PICTURE OF GOP CANNOT BE ACCURATELY REPRODUCED DUE TO, E.G., EDITING |

FIG.24A

| | | | | |
|---|---|---|---|---|
| PICTURE LAYER | PSC | PICTURE START CODE | 32 | PICTURE LAYER START SYNC CODE |
| | TR | TEMPORAL REFERENCE | 10 | NUMBER INDICATING PICTURE DISPLAY ORDER; RESET AT HEAD OF GOP; REMAINDER OF 1024 |
| | PCT | PICTURE CODING TYPE | 3 | PICTURE TYPE |
| | VD | VBV DELAY | 16 | INITIAL STATUS OF BUFFER AT THE TIME OF RANDOM ACCESS |
| | FPFV | FULL PEL FORWARD VECTOR | 1 | WHETHER ACCURACY OF FORWARD MOTION VECTOR IS BASED ON INTEGER OR ON HALF PIXEL |
| | FFC | FORWARD CODE | 3 | FORWARD MOTION VECTOR SEARCH RANGE |
| | FPBV | FULL PEL BACKWORD VECTOR | 1 | WHETHER ACCURACY OF BACKWARD MOTION VECTOR IS BASED ON INTEGER OR ON HALF PIXEL |
| | BFC | BACKWARD F CODE | 3 | BACKWARD MOTION VECTOR SEARCH RANGE |

FIG.24B

| | | | | |
|---|---|---|---|---|
| | EBP | EXTRA BIT PICTURE | 1 | PRESENCE/ABSENCE OF OTHER PICTURE INFORMATION |
| | EIP | EXTRA INFORMATION PICTURE | 8×n | USE FOR FUTURE EXTENSION |
| | ESCI | EXTENSION START CODE IDENTIFIER | 4 | CODE SHOWING EXTENSION DATA TO BE SENT |
| | FHFC | FORWARD HORIZONTAL F CODE | 4 | FORWARD HORIZONTAL MOTION VECTOR SEARCH RANGE |
| | FVFC | FORWARD VERTICAL F CODE | 4 | FORWARD VERTICAL MOTION VECTOR SEARCH RANGE |
| | BHFC | BACKWARD HORIZONTAL F CODE | 4 | BACKWARD HORIZONTAL MOTION VECTOR SEARCH RANGE |
| | BVFC | BACKWARD VERTICAL F CODE | 4 | BACKWARD VERTICAL MOTION VECTOR SEARCH RANGE |
| | IDP | INTRA DC PRECISION | 2 | ACCURACY OF DC COEFFICIENT |

| |
|---|
| FIG.25A |
| FIG.25B |
| FIG.25C |

| LAYER | ABBREV. | CONTENT IN ENGLISH | BIT LENGTH | NOTE |
|---|---|---|---|---|
| | PSTR | PICTURE STRUCTURE | 2 | SHOWING FRAME STRUCTURE/FIELD STRUCTURE; TOGETHER WITH UPPER FIELD/LOWER FIELD IN THE CASE OF FIELD STRUCTURE |
| | TFF | TOP FIELD FIRST | 1 | IN THE CASE OF FRAME STRUCTURE, SHOWING WHETHER INITIAL FIELD IS UPPER FIELD OR LOWER FIELD |
| | FPFD | FRAME PREDICTIVE FRAME DCT | 1 | IN THE CASE OF FRAME STRUCTURE, SHOWING THAT FRAME MODE DCT PREDICTION IS FOR FRAME MODE ONLY |
| | CMV | CONCEALMENT MOTION VECTORS | 1 | SHOWING ATTACHMENT OF MOTION VECTOR TO INTRA MB FOR CONCEALING TRANSMISSION ERROR |
| | QST | Q SCALE TYPE | 1 | TO USE LINEAR QUANTIZING SCALE OR NON-LINEAR QUANTIZING SCALE |
| | IVF | INTRA VLC FORMAT | 1 | TO USE ANOTHER 2D-VLC FOR INTRA MB OR NOT |

FIG.25A

| | | | | |
|---|---|---|---|---|
| PICTURE LAYER | AS | ALTERNATE SCAN | 1 | TO USE ZIGZAG SCAN OR ALTERNATE SCAN |
| | RFF | REPEAT FIRST FIELD | 1 | USED FOR 2:3 PULL-DOWN |
| | C 420 T | CHROMA 420 TYPE | 1 | IDENTICAL WITH PF FOR 4:2:0 OR ZERO FOR OTHERS |
| | RF | PROGRESSIVE FRAME | 1 | WHETHER OR NOT PICTURE IS BASED ON SEQUENTIAL SCANNING |
| | CDF | COMPOSITE DISPLAY FLAG | 1 | WHETHER ORIGINAL SIGNAL IS COMPOSITE SIGNAL OR NOT |
| | VA | V AXIS | 1 | USED IF ORIGINAL SIGNAL IS PAL |
| | FS | FIELD SEQUENCE | 3 | USED IF ORIGINAL SIGNAL IS PAL |
| | SC | SUB CARRIER | 1 | USED IF ORIGINAL SIGNAL IS PAL |

*FIG.25B*

| | | | | |
|---|---|---|---|---|
| | BA | BURST AMPLITUDE | 7 | USED IF ORIGINAL SIGNAL IS PAL |
| | SCP | SUB CARRIER PHASE | 8 | USED IF ORIGINAL SIGNAL IS PAL |
| | ESCI | EXTENSION START CODE IDENTIFIER | 4 | CODE SHOWING EXTENSION DATA TO BE SENT |
| | LIQM | LOAD INTRA QUANTIZER MATRIX | 1 | PRESENCE OF QUANTIZES MATRIX FOR INTRA MB |
| | IQM | INTRA QUANTIZER MATRIX | 8×64 | VALUE OF QUANTIZER MATRIX FOR INTRA MB |
| | LNIQM | LOAD NON INTRA QUANTIZER MATRIX | 1 | PRESENCE OF QUANTIZES MATRIX DATA FOR NON-INTRA MB |
| | NIQN | NON INTRA QUANTIZER MATRIX | 8×64 | VALUE OF QUANTIZER MATRIX FOR NON-INTRA MB |
| | LCIQM | LOAD CHRAMA INTRA QUANTIZER MATRIX | 1 | PRESENCE OF QUANTIZER MATRIX DATA FOR CHROMA INTRA |

| FIG.26A |
|---|
| FIG.26B |
| FIG.26C |

| LAYER | ABBREV. | CONTENT IN ENGLISH | BIT LENGTH | NOTE |
|---|---|---|---|---|
| | CIQM | CHROMA INTRA QUANTIZER MATRIX | 8×64 | VALUE OF QUANTIZER MATRIX FOR CHROMA INTRA MB |
| | LCNIQM | LOAD CHROMA NON INTRA QUANTIZER MATRIX | 1 | PRESENCE OF QUANTIZER MATRIX DATA FOR CHROMA NON-INTRA MB |
| | CNIQM | CHROMA NON INTRA QUANTIZER MATRIX | 8×64 | VALUE OF QUANTIZER MATRIX FOR CHROMA NON-INTRA MB |
| | ESCI | EXTENSION START CODE IDENTIFIER | 4 | CODE SHOWING EXTENSION DATA TO BE SENT |
| | ECHO | FRAME CENTER HORIZONTAL OFFSET | 16 | VALUE FOR SHIFTING DISPLAY AREA HORIZONTALLY |
| | FCVO | FRAME CENTER VERTICAL OFFSET | 16 | VALUE FOR SHIFTING DISPLAY AREA VERTICALLY |
| | ESCI | EXTENSION START CODE IDENTIFIER | 4 | SHOWING EXTENSION DATA TO BE SENT |

FIG.26A

| | | | | |
|---|---|---|---|---|
| PICTURE LAYER | LLTR | LOW LAYER TEMPORAL REFERENCE | 10 | TIME REFERENCE OF LOWER LAYER TO BE USED FOR PREDICTION WITH SPATIAL SCALABILITY |
| | LLHO | LOWER LAYER HORIZONTAL OFFSET | 15 | HORIZONTAL OFFSET OF LOWER LAYER PICTURE TO BE USED FOR PREDICTION WITH SPATIAL SCALABILITY |
| | LLVO | LOWER LAYER VERTICAL OFFSET | 15 | VERTICAL OFFSET OF LOWER LAYER PICTURE TO BE USED FOR PREDICTION WITH SPATIAL SCALABILITY |
| | STWC TI | SPATIAL TEMPORAL WEIGHT CODE TABLE INDEX | 2 | METHOD OF UP-SAMPLING IMAGE OF LOWER LAYER WITH SPATIAL SCALABILITY |
| | LLPF | LOWER LAYER PROGRESSIVE FRAME | 1 | SHOWING THAT LOWER LAYER IS SEQUENTIALLY PROCESSED IMAGE WITH SPATIAL SCALABILITY |
| | LLDFS | LOWER LAYER DEINTERLACED FIELD SELECT | 1 | METHOD OF UP-SAMPLING IMAGE OF LOWER LAYER WITH SPATIAL SCALABILITY |

FIG.26B

| | | | | |
|---|---|---|---|---|
| | ESCI | EXTENSION START CODE IDENTIFIER | 4 | CODE SHOWING EXTENSION DATA TO BE SENT |
| | RSC | REFERENCE SELECT CODE | 2 | WHICH REFERENCE IMAGE TO BE USED WITH TIME SCALABILITY |
| | FTR | FORWARD TEMPORAL REFERENCE | 10 | TIME REFERENCE OF PICTURE TO BE USED FOR FORWARD PREDICTION WITH TIME SCALABILITY |
| | BTR | BACKWARD TEMPORAL REFERENCE | 10 | TIME REFERENCE OF PICTURE TO BE USED FOR BACKWARD PREDICTION WITH TIME SCALABILITY |
| SLICE LAYER | SSC | SLICE START CODE | 32 | SYNC CODE INDICATING START OF SLICE LAYER |
| | SVPE | SLICE VERTICAL POSITION EXTENSION | 1 | EXTENSION CODE ATTACHED WHEN VERTICAL IMAGE SIZE IS ABOVE 2800; INDICATING SLIDE POSITION IN COMBINATION WITH SSC |

| FIG.27A |
|---|
| FIG.27B |
| FIG.27C |

| LAYER | ABBREV. | CONTENT IN ENGLISH | BIT LENGTH | NOTE |
|---|---|---|---|---|
| SLICE LAYER | PBP | PRIORITY BREAK POINT | 7 | INDICATING DATA RANGE INCLUDED IN SLICE WHEN SCALABILITY MODE IS DATA PARTITIONING |
| | QSC | QUANTIZER SCALE CODE | 5 | INDICATING LEADING MB QUANTIZING STEP OF SLICE |
| | ISF | INTRA SLICE FLAG | 1 | FLAG SHOWING PRESENCE OF NEXT IS INFORMATION |
| | IS | INTRA SLICE | 1 | INDICATING THAT ENTIRE SLICE CONSISTS OF INTRA MBS |
| | RB | RESERVED BITS | 7 | RESERVED BITS FOR FUTURE EXTENSION |
| | EBS | EXTRA BIT SLICE | 1 | FLAG SHOWING PRESENCE OF NEXT EIS INFORMATION |
| | EIS | EXTRA INFORMATION SLICE | 8 | USED FOR FUTURE EXTENSION |

FIG.27A

| | | | | |
|---|---|---|---|---|
| MACRO-BLOCK LAYER | MBE | MACRO BLOCK ESCAPE | 11 | ESCAPE CODE OF MACRO BLOCK ADDRESS |
| | MBAI | MACRO BLOCK ADDRESS INCREMENT | 1-11 | VLC INDICATING NUMBER OF MBs TO SKIP FORWARD (+1); NUMBER OF MBs FROM LEFT END OF IMAGE |
| | MBT | MACRO BLOCK TYPE | 1-9 | VLC INDICATING MB CODING MODE |
| | STWC | SPATIAL TEMPORAL WEIGHT CODE | 2 | UP-SAMPLING METHOD OF LOWER LAYER IMAGE WITH TIME SCALABILITY |
| | FrMT | FRAME MOTION TYPE | 2 | PREDICTION TYPE OF FRAME |
| | FiMT | FIELD MOTION TYPE | 2 | PREDICTION TYPE OF FIELD |

FIG.27B

| | | | | |
|---|---|---|---|---|
| | DT | DCT TYPE | 1 | FRAME MODE/FIELD MODE OF DCT |
| | QSC | QUANTIZER SCALE CODE | 5 | STEP SIZE OF MB QUANTIZING STEP |
| | MVFS | MOTION VERTICAL FIELD SELECT | 1 | WHICH FIELD OF REFERENCE IMAGE SHOULD BE PREDICTED FIRST, IN THE CASE OF FIELD PREDICTION |
| | MHC | MOTION HORIZONTAL CODE | 1-11 | DIFFERENCE BETWEEN HORIZONTAL COMPONENT OF MB MOTION VECTOR AND PREVIOUS VECTOR AND CODED BY VLC |
| | MHr | MOTION HORIZONTAL r | 1-8 | USED TOGETHER WITH MHC |
| | DH | DMV HORIZONTAL | 1-2 | VLC SHOWING HORIZONTAL DIFFERENCE VECTOR IN THE CASE OF DUAL PRIME PREDICTION |

| FIG.28A |
| --- |
| FIG.28B |

| LAYER | ABBREV. | CONTENT IN ENGLISH | BIT LENGTH | NOTE |
| --- | --- | --- | --- | --- |
| MACRO-BLOCK LAYER | MVC | MOTION VERTICAL CODE | 1-11 | DIFFERENCE BETWEEN VERTICAL COMPONENT OF MB MOTION VECTOR AND PREVIOUS VECTOR AND CODED BY VLC |
| | MVr | MOTION VERTICAL r | 1-8 | USED TOGETHER WITH MVC |
| | DV | DMV VERTICAL | 1-2 | VLC SHOWING VERTICAL DIFFERENCE VECTOR IN THE CASE OF DUAL PRIME PREDICTION |
| | CBP 420 | CODED BLOCK PATTERN 420 | 3-9 | CBP FOR 4:2:0 |
| | CBP1 | CODED BLOCK PATTERN 1 | 2 | INFORMATION ADDED TO CBP420 IN THE CASE OF 4:2:2 |
| | CBP2 | CODED BLOCK PATTERN 2 | 6 | INFORMATION ADDED TO CBP420 IN THE CASE OF 4:4:4 |

FIG.28A

| | | | | |
|---|---|---|---|---|
| BLOCK LAYER | DDSL | DCT DC SIZE LUMINANCE | 2-9 | NUMBER OF BITS OF LUMINANCE DCT DC DIFFERENCE |
| | DDSC | DCT DC SIZE CHROMINANCE | 2-10 | NUMBER OF BITS CHROMA DCT DC DIFFERENCE |
| | DDD | DCT DC DIFFERENTIAL | 1-11 | VLC OF DIFFERENCE BETWEEN DC COMPONENT OF BLOCK AND THAT OF PREVIOUS BLOCK |
| | FDC | FIRST DCT COEFFICIENTS | 2-24 | FOR NON-INTRA MB, VLC PRODUCED BY ADVANCING DCT COEFFICIENT ZIGZAG FORM (0,0), AND COMBINING INITIAL NON-ZERO COEFFICIENT AND IMMEDIATELY PRECEDING ZERO COEFFICIENT |
| | SDC | SUBSEQUENT DCT COEFFICIENTS | 2-24 | FOR NEXT COEFFICIENT OF INTRA MB AND NON-INTRA MB, VCL PRODUCED BY ADVANCING DCT COEFFICIENT ZIGZAG AND COMBINING NON-ZERO COEFFICIENT AND IMMEDIATELY PRECEDING ZERO COEFFICIENT |
| | EOB | END OF BLOCK | 2 | SHOWING THAT ALL COEFFICIENTS FOLLOWING BLOCK ARE ZERO |

*FIG.28B*

COMPRESSION CODING DEVICE WITH SCRAMBLING FUNCTION AND EXPANSION REPRODUCING DEVICE WITH DESCRAMBLING FUNCTION

BACKGROUND OF THE INVENTION

1. Field of the Invention

The present invention relates to a compression coding device having a scrambling function, and an expansion reproducing device having a descrambling function. More particularly, the present invention is concerned with a compression coding device adaptive to the MPEG (Moving Picture Experts Group) 2 standard and capable of scrambling and coding data, and an expansion reproducing device also adaptive to the MPEG 2 standard and capable of descrambling and decoding the data scrambled by the coding device.

2. Description of the Background Art

In Japan, for example, scrambled broadcasting using a broadcasting satellite (BS) started in 1991 while broadcasting using a communication satellite (CS) started in 1992 and was scrambled like BS broadcasting. It is a common practice with BS or CS television broadcasting to scramble analog video signals by a line permutation (scanning line transfer) system, line rotation (intra-line signal switching) system, Skyport system, video cypher system, B-MAC system or similar system.

The line permutation system changes the order of scanning lines. The line rotation system provides a cut point or cut points in the individual scanning line and replaces the segments divided by the cut point or points. The Skyport system replaces all the scanning lines at random. The video cypher system removes synchronizing signals from a video signal, and at the same time, reverses the polarity. Further, the B-MAC system varies the length of the individual scanning line at random.

With the advent of full-scale multimedia environments handling speech, data and image (picture) totally, ISO (International Organization for Standardization) is standardizing various kinds of information compression technologies constituting the heart of multimedia. Recently, ISO has standardized MEPG1 as a moving picture coding system for storage and directed toward CD-ROMs (Compact Disk Read Only Memories) and other storage media. Later, ISO has standardized MPEG2 applicable not only to storage media but also to communication and broadcasting media.

A compression coding device adaptive to MPEG2 produces an I picture (Intra-Picture) for a preselected frame or picture of an input moving picture by using, e.g., an intra-frame/intra-field coding system. The coding system produces a P picture (Predictive-Picture) for a single preselected picture different from the I picture by using interframe/interfield forward predictive coding system. Further, the coding system produces a B picture (Bidirectionally Predictive-Picture) for preselected two pictures different from the I and P pictures by using a bidirectionally predictive coding system. The I, P and B pictures, or coded or compressed data, are repeatedly output in the order of, e.g., GOPs (Group-Of-Pictures) shown in FIG. 13B. The coded data output in such an order are, e.g., digitally modulated and broadcast via a BS.

To reproduced the BS broadcast coded data on a monitor, use is made of an expansion reproducing device adaptive to MPEG2. The reproducing device decodes the coded data received from a satellite and transforms the decoded data to a signal which can be displayed by the monitor.

However the problem with the conventional coding device adaptive to MPEG2 is that the coded data are not scrambled despite that the broadcast is chargeable. As a result, any person can decoded the coded data and enjoy a moving picture based on the decoded data on, e.g., a monitor for free only if the person has the expansion reproducing device at hand.

SUMMARY OF THE INVENTION

It is therefore an object of the present invention to provide a compression coding device capable of outputting scrambled coded data, and an expansion reproducing device capable of descrambling and decoding the coded data received from the coding device.

In accordance with the present invention, a compression coding device for handling a single picture or a preselected plurality of pictures as a single group of pictures, and coding digital image data representative of the individual picture included in the single group of pictures, and having a scrambling function includes a coder for coding the image data representative of the individual picture to thereby output coded image data. A memory stores the coded image data output from the coder. A multiplexer multiplexes the coded image data read out of the memory a preselected position of an output data format. A controller controls the coder, memory and multiplexer on the basis of a preselected scrambling system. The image data representative of the individual picture are divided into a plurality of slices each being subdivided into a plurality of macroblocks. The controller generates, when writing the coded image data in the memory, a control signal for writing the coded image data in the order of the positions of the slices, from the top to the bottom as seen on a picture, constituting the individual picture, and feeds the control signal to the memory. The controller generates, when scrambling the coded image data on the basis of the preselected scrambling system, a control signal for reading the coded image data in the order of the slices different from the order of writing to thereby output scrambled coded image data, feeds the control signal to the memory thereby cause the multiplexer to multiplex the scrambled coded image data fed thereto in the preselected position of the output data format, generates information representative of positions of the slices occurred before and after the scrambling, and feeds the information to the multiplexer as control data to thereby cause the multiplexer to multiplex the control data in a preselected position of the output data format.

Also, in accordance with the present invention, an expansion reproducing device includes a demultiplexer for receiving a signal containing image data and control data from the multiplexer included in the above compression coding device for separating the signal into the image data and control data. A memory stores the image data output from the demultiplexer. A decoder decodes the image data read out of the memory. A controller controls the demultiplexer, memory and decoder in accordance with the control data output from the demultiplexer. The controller generates, when storing the image data output from the demultiplexer in the memory, a control signal for writing the image data in the order of slices representative of the individual picture and each consisting of a plurality of macroblocks, and feeds the control signal to the memory. The controller generates, when received information contained in the control data and representative of the positions of the slices occurred before and after scrambling, a control signal for reading the image data in the order of the positions of the slices occurred before the scrambling, hut from the positions of the slices occurred after the scrambling, and feeds the control signal to the memory thereby cause descrambled image data to be output from the memory.

BRIEF DESCRIPTION OF THE DRAWINGS

The objects and features of the present invention will become more apparent from the consideration of the following detailed description taken in conjunction with the accompanying drawings in which:

FIGS. 1 and 2 are combined;

FIG. 5 is schematic block diagram showing, when combined with FIG. 6, an expansion reproducing device also embodying the present invention and having a descrambling function;

FIG. 15 shows specific positions of slices constituting a single picture and not subjected to scrambling by the embodiment shown in FIGS. 1 and 2;

FIG. 16 shows specific positions of the slices shown in FIG. 15 and subjected to scrambling;

FIGS. 20A, 20B, 20C and 20D show, when combined as shown in FIG. 20, another part of the hierarchical structure;

FIGS. 21A, 21B, 21C and 21D show, when combined as shown in FIG. 21, show still another part of the hierarchical structure;

FIGS. 22A, 22B and 22C show, when combined as shown in FIG. 22, the contents of a part of abbreviations shown in FIGS. 19A–19C;

FIGS. 23A, 23B and 23C show, when combined as shown in FIG. 23, the contents of another part of the abbreviations;

FIGS. 24A, 24B and 24C show, when combined as shown in FIG. 24, the contents of another part of the abbreviations;

FIGS. 25A, 25B and 25C show, when combined as shown in FIG. 25, the contents of another part of the abbreviations;

FIGS. 26A, 26B and 26C show, when combined as shown in FIG. 26, the contents of another part of the abbreviations;

FIGS. 27A, 27B and 27C show, when combined as shown in FIG. 27, the contents of another part of the abbreviations; and FIGS. 28A and 28B show, when combined as shown in FIG. 28, the contents of the rest of the abbreviations.

DESCRIPTION OF THE PREFERRED EMBODIMENTS

Figure 7:
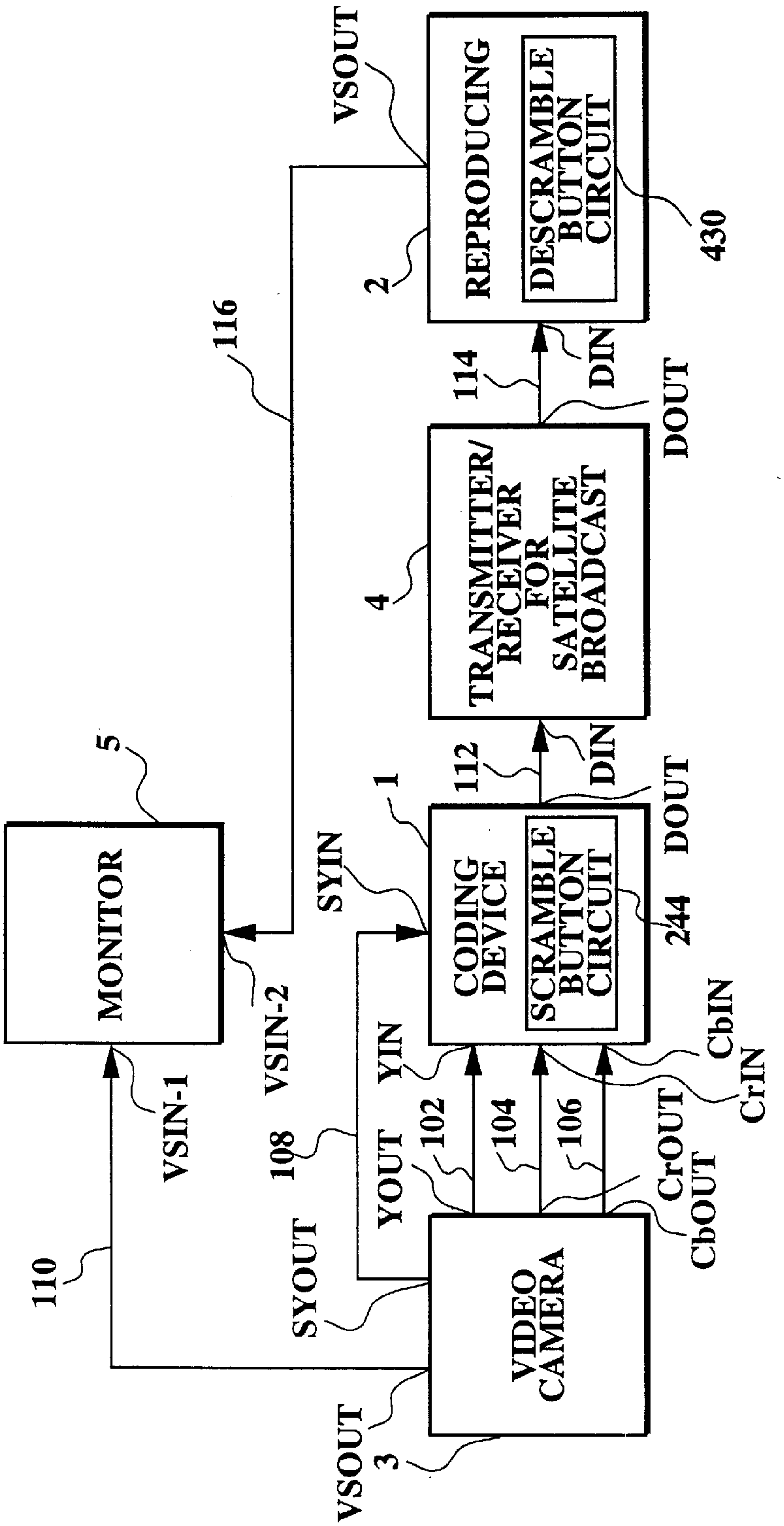
FIG. 7 is a block diagram schematically showing a specific system configuration in which the compression coding device and expansion reproducing device are connected.

Referring to FIG. 7 of the drawings, a specific system configuration including a compression coding device 1 with a scrambling function and an expansion reproducing device 2 with a descrambling function in accordance with the present invention is shown. The coding device 1 and reproducing device 2 are applicable to, e.g., a digital BS broadcasting system for moving pictures adaptive to MPEG2. As shown, a video camera 3 sequentially sends an NTSC (National Television System Committee) moving picture to the coding device 1. The coding device 1 codes and scrambles the moving picture frame by frame, or picture by picture, while feeding the resulting scrambled compressed image data to a transmitter/receiver 4 for satellite broadcasting. The transmitter/receiver 4 demodulates the compressed image data and delivers them to the reproducing device 2. The reproducing device 2 descrambles and decodes the demodulated image data and thereby reproduces an NTSC video signal based on the decoded data. The video signal representative of the moving picture is output to a monitor 5.

In the illustrative embodiment, the coding device 1 includes a scramble button circuit 244. When a button included in the scramble button circuit 244 is pressed, the coding device 1 scrambles the coded data of the moving picture picture by picture. The scrambled image data are fed to the reproducing device 2 via the transmitter/receiver 4, as stated above. In the embodiment, the reproducing device 2 has a descramble button circuit 430 including a button. When the button of the circuit 430 is pressed, the reproducing device 2 descrambles the compressed image data received from the transmitter/receiver 4 and delivers the descrambled data to the monitor 5. In this condition, a picture identical with the moving picture output from the camera 3 appears on the monitor 5. If the button of the descramble button circuit 430 is not pressed, the moving picture output from the camera 3 does not appear on the monitor 5 because it is not descrambled.

Assume that neither the button of the button circuit 244 nor the button of the button circuit 430 is pressed. Then, the coding device 1 feeds non-scrambled coded image data to the reproducing device 2. In response, the reproducing device 2 decodes the non-scrambled coded image data and feeds the resulting data to the monitor 5. In this case, a picture identical with the moving picture output from the camera 3 appears on the monitor 5.

The coding device 1 is connected to the video camera 3 and transmitter/receiver 4. The camera 3 outputs an NTSC video signal in the illustrative embodiment. The transmitter/receiver 4 broadcasts or receives the compressed image data output from the device 1. The transmitter/receiver 4 is connected to the reproducing device 2 which is in turn connected to the monitor 5. The monitor 5 displays the NTSC video signal output from the device 2 and is connected to the camera 3 also. If desired, the devices I and 2 may be directly connected without the intermediary of the transmitter/receiver 4.

More specifically, the camera 3 and coding device 1 are connected to each other by four signal lines 102, 104, 106 and 108. The camera 3 has output terminals YOUT, GrOUT, CbOUT and SYOUT respectively assigned to a luminance signal Y, a chrominance signal R-Y, a chrominance signal B-Y, and synchronizing signals. The coding device 1 has input terminals YIN, CrIN, CbIN and SYIN respectively connected to the output terminals YOUT-SYOUT of the camera 3 by the signal lines 102–108. In this configuration, the camera 3 delivers an analog luminance signal Y, two analog chrominance signals Cr and Cb and synchronizing signals to the coding device 1 via the signal lines 102–108, respectively. The synchronizing signals include a horizontal synchronizing signal, a vertical synchronizing signal, and a color subcarrier signal. The camera 3 additionally includes an output terminal VSOUT connected to a first video signal input terminal VSIN-1 included in the monitor 5 via a signal line 110. The NTSC video signal output from the camera 3 is fed to the monitor 5 via the signal line 110.

Figure 1:
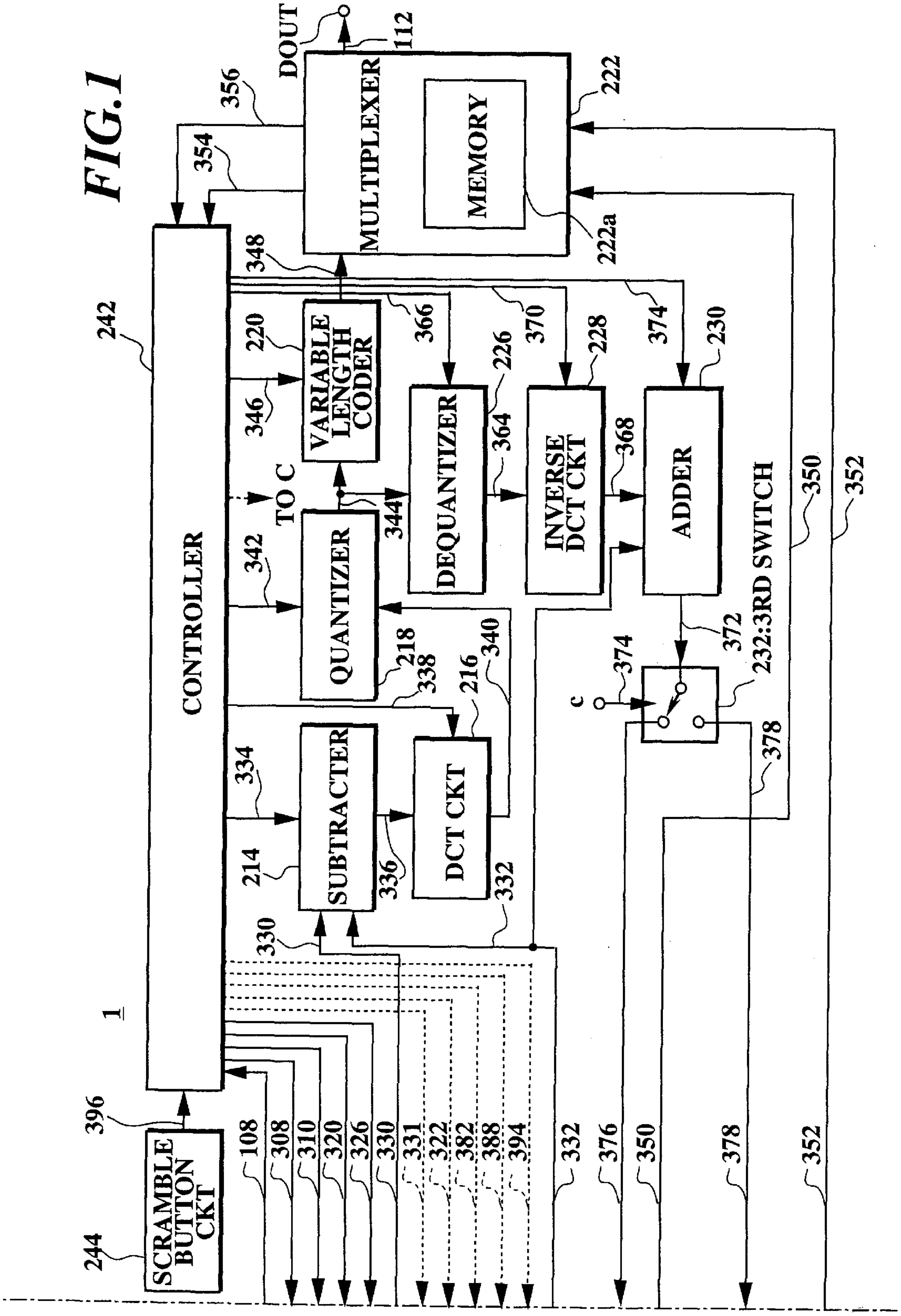
FIG. 1 is a schematic block diagram showing, when combined with FIG. 2, a compressing coding device embodying the present invention and having a scrambling function.
Figure 2:
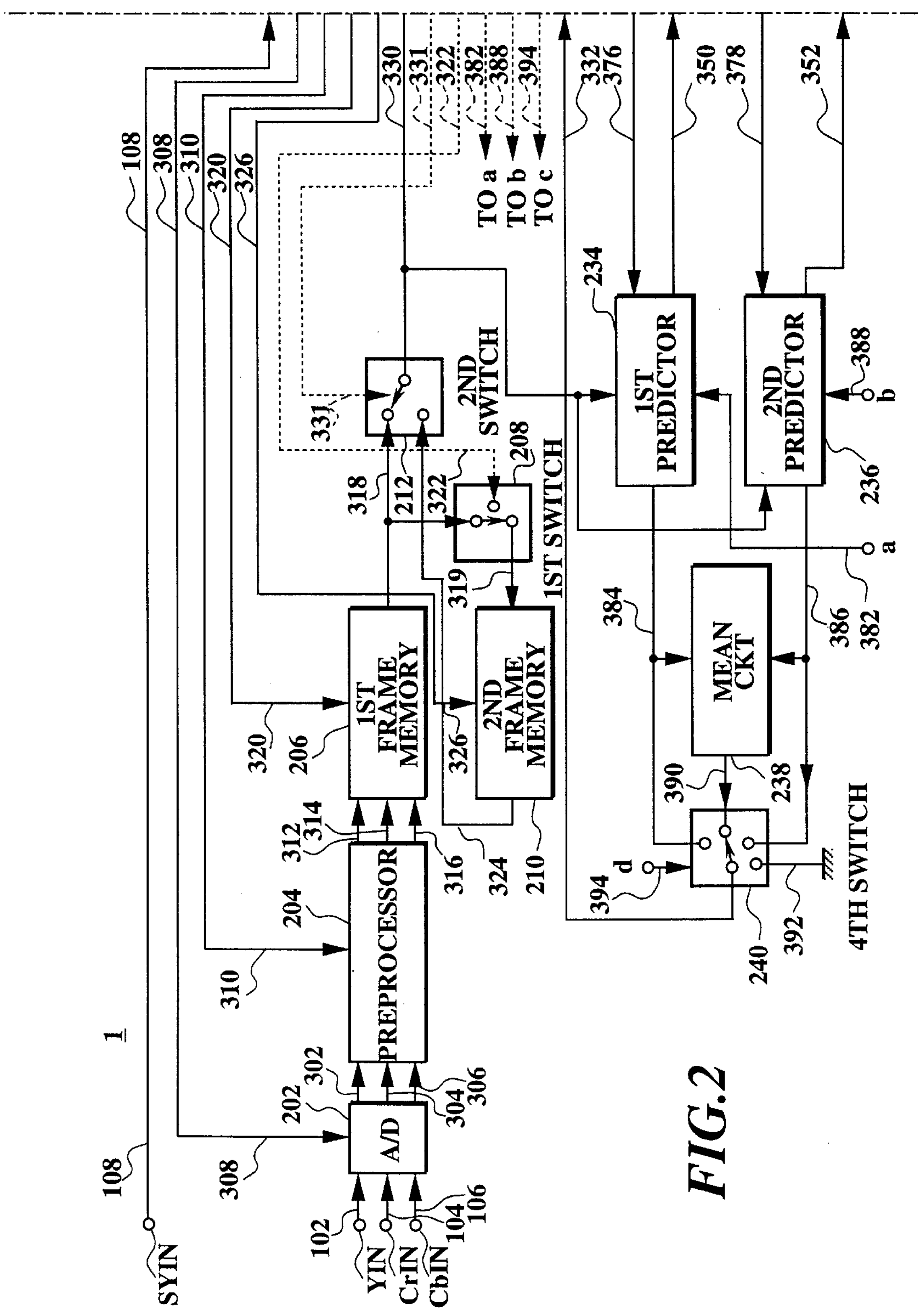
FIG. 2 is a schematic block diagram showing the embodiment when combined with FIG. 1.
Figure 3:
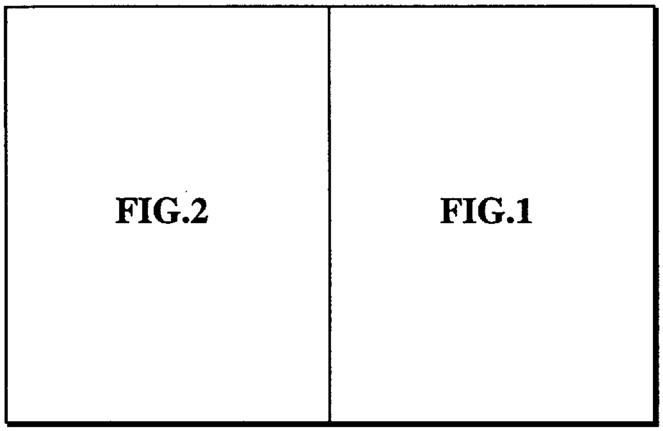
FIG. 3 shows how
Figure 4:
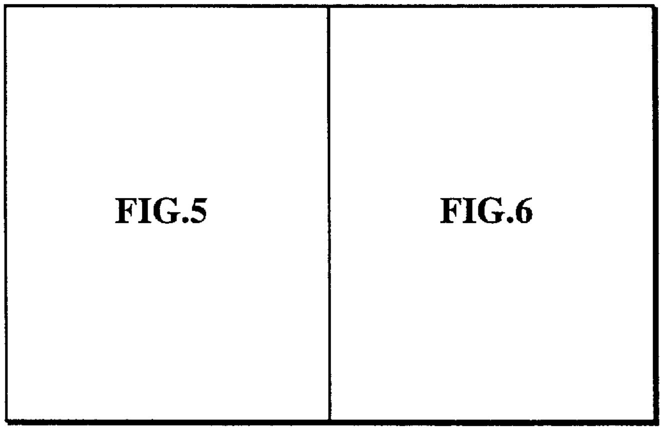
FIG. 4 shows how
Figure 5:
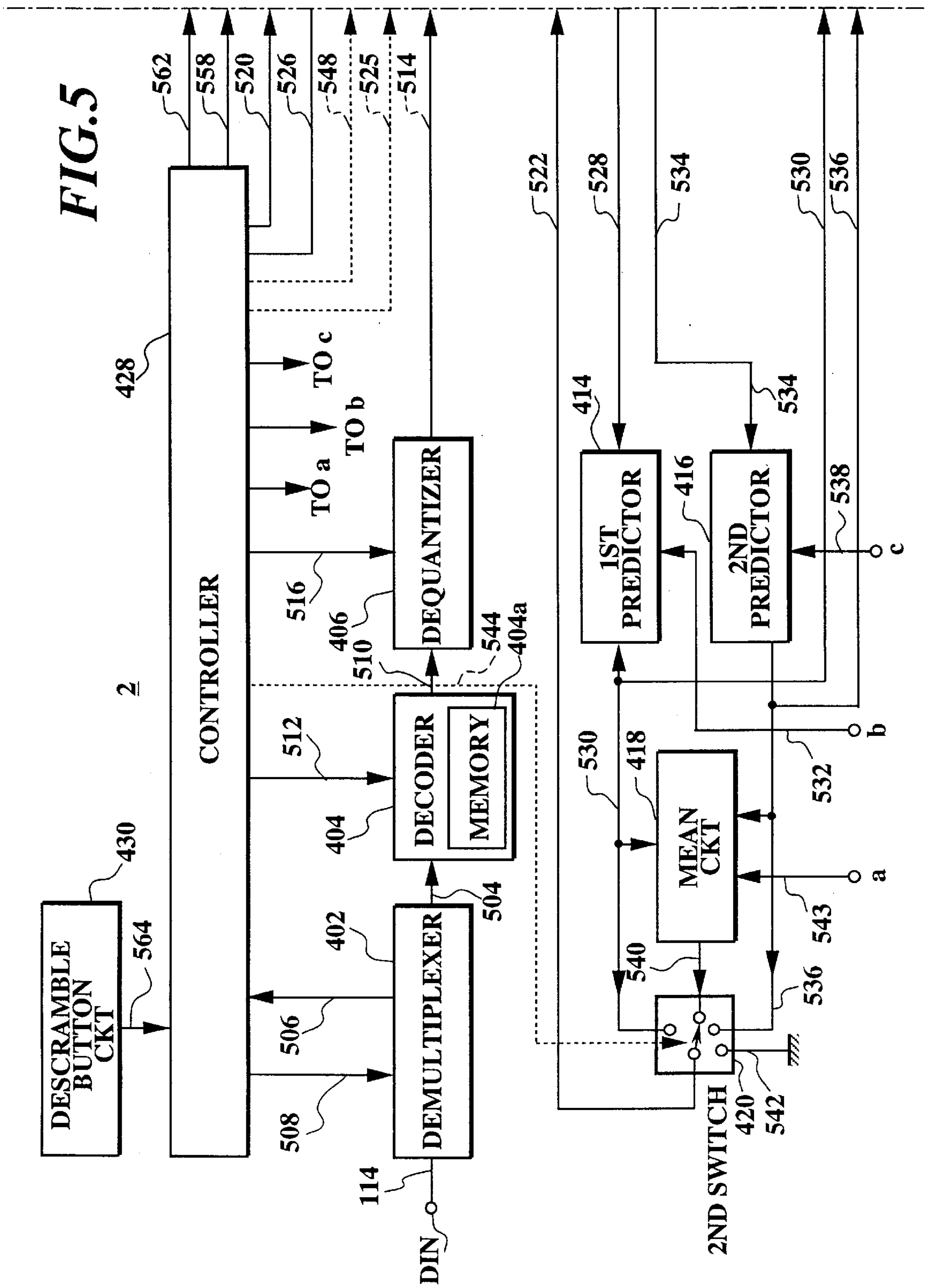
FIGS. 5 and 6 are combined.
Figure 6:
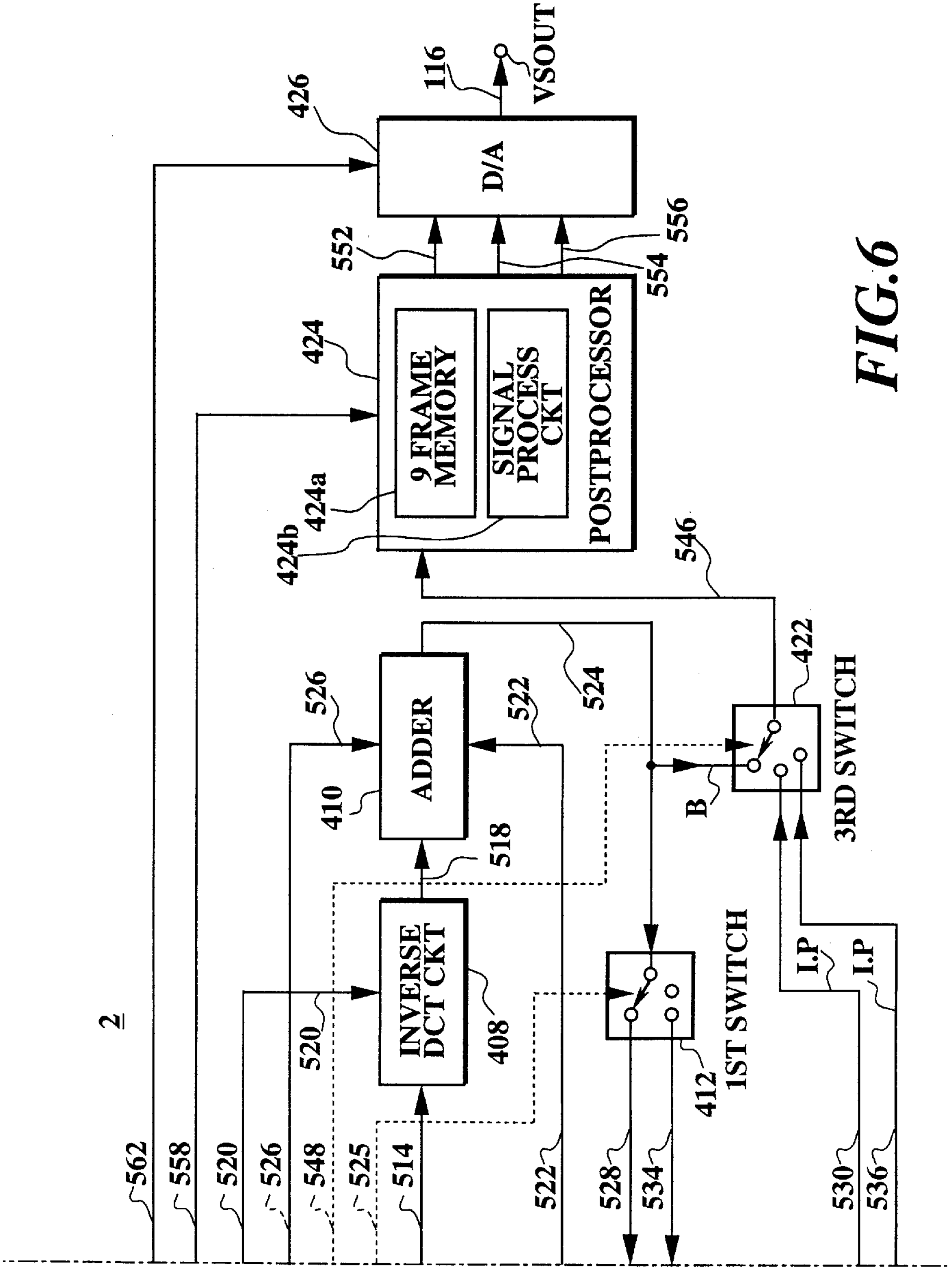

The coding device 1 includes a compressed image data output terminal DOUT connected to a compressed image data input terminal DIN included in the transmitter/receiver 4 by a signal line 112. In the illustrative embodiment, the coding device 1 feeds to the transmitter/receiver 4 the scrambled signal having the format prescribed by MPEG2. The transmitter/receiver 4 includes a compressed image data output terminal DOUT connected to a compressed data input terminal DIN included in the reproducing device 2 by a signal line 114. In the embodiment, the transmitter/receiver 4 feeds the demodulated and scrambled signal having the above format to the reproducing device 2. The reproducing device 2 descrambles and decodes the input image data, generates an NTSC video signal based on the decoded data, and then outputs the video signal via the output terminal VSOUT. This video signal is applied to a second video signal input terminal VSIN-2 included in the monitor 5 via a signal line 116. FIGS. 1 and 2 show, when combined as shown in FIG. 3, the coding device embodying the present invention. Likewise, FIGS. 5 and 6 show, when combined as shown in FIG. 4, the reproducing device 2 also embodying the present invention.

As shown in FIGS. 1 and 2, the coding device 1 has an analog-to-digital converter (ADC) 202, a preprocessor 204, a first frame memory 206, a first switch 208, a second frame memory 210, a second switch 212, a subtracter 214, a DCT (Discrete Cosine Transform) circuit 216, a quantizer 218, a variable length coder 220, a multiplexer 222, a dequantizer 226, an inverse DCT circuit 228, an adder 230, a third switch 232, a first predictor 234, a second predictor 236, a mean circuit 238, a fourth switch 240, a controller 242, and the scramble button circuit 244 mentioned earlier. The dequantizer 226, inverse DCT circuit 228, adder 230, third switch 232, first and second predictors 234 and 236, mean circuit 238 and fourth switch 240 constitute a local decoder in combination.

Figure 8:
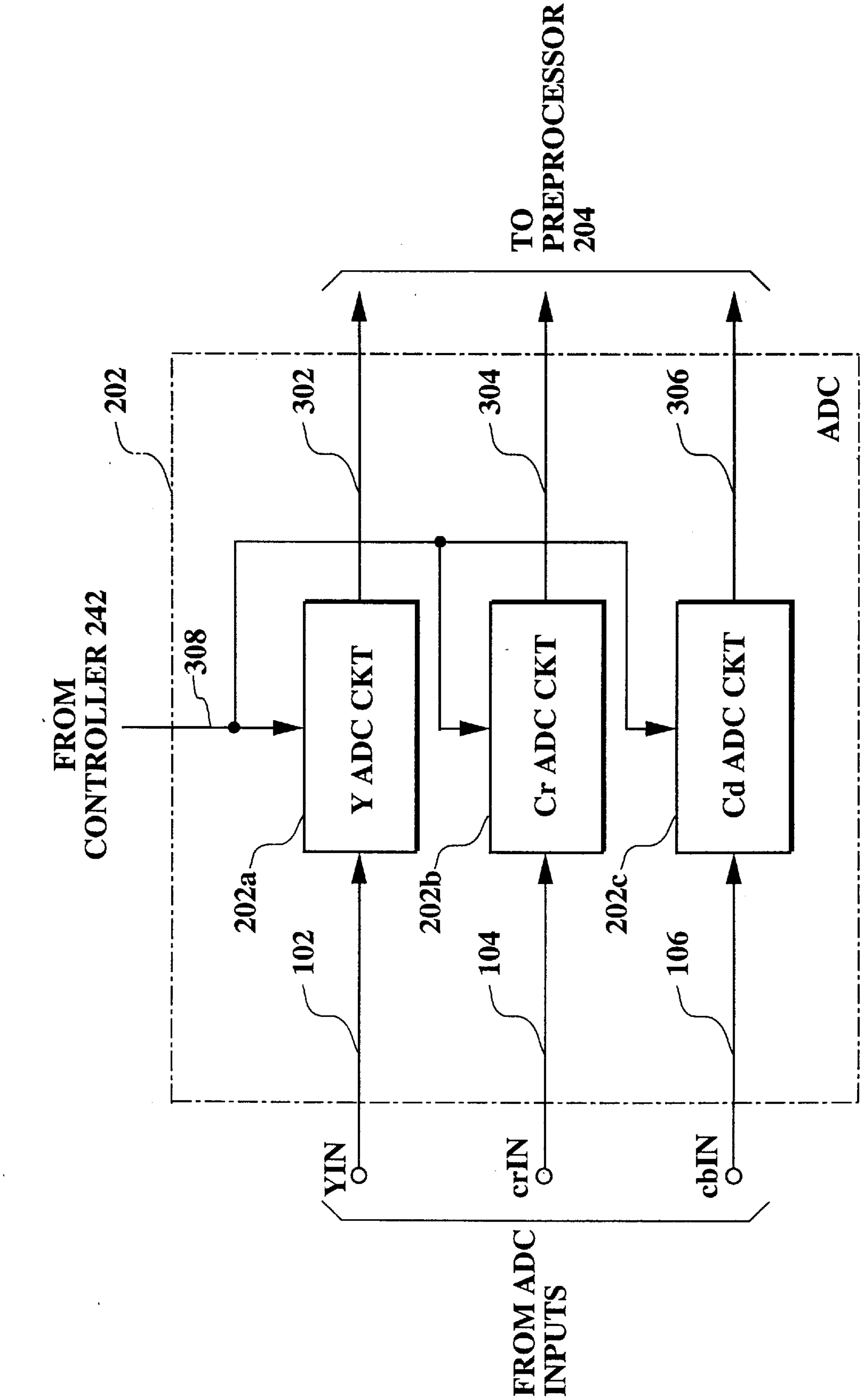
FIG. 8 is a schematic block diagram showing a specific configuration of an analog-to-digital converter included in the circuitry of FIG. 2.

As shown in FIG. 8, the ADC 202 is made up of a Y ADC circuit 202*a*, a Cr ADC circuit 202*b*, and a Cb ADC 202*c*. The analog luminance signal Y output from the camera 3 is fed to the input of the Y ADC circuit 202 via the input terminal YIN of the coding device 1 and a signal line 102. In the illustrative embodiment, the luminance signal Y has 240 valid scanning lines for a field. The ADC circuit 202*a* transforms the luminance signal Y to corresponding digital data. Specifically, while the controller 242 feeds a sampling signal to the ADC circuit 202*a* via a control line 308, the ADC circuit 202*a* digitizes the luminance signal Y at a rate of 704 dots for a scanning line except for a blanking period, and eight bits for a pixel. In the embodiment, the sampling signal output from the controller 242 has a frequency of 13.5 MHz.

The analog chrominance signal Cr output from the camera 3 is applied to the input of the Cr ADC circuit 202*b* via the input terminal CrIN of the coding device 1 and a signal line 104. In the illustrative embodiment, the chrominance signal Cr has 240 valid scanning lines for a field. The ADC circuit 202*b* transforms the chrominance signal Cr to corresponding digital data. Specifically, while the controller 242 feeds a sampling signal to the ADC circuit 202*b* via the control line 308, the ADC circuit 202*b* digitizes the chrominance signal Cr at a rate of 352 dots for a scanning line except for a blanking period, and eight bits for a pixel. In the embodiment, the sampling signal output from the controller 242 has a frequency of 6.75 MHz.

Further, the analog chrominance signal Cb output from the camera 3 is applied to the input of the Cb ADC circuit 202*c* via the input terminal CbIN of the coding device 1 and a signal line 106. In the illustrative embodiment, the chrominance signal Cb also has 240 valid scanning lines for a field. The ADC circuit 202*c* is identical in construction and operation with the ADC circuit 202*b* except for the kind of a signal to deal with. As the above sampling frequency indicates, this embodiment codes 4:2:2 pictures prescribed by ITU (International Telecommunication Union)-R Recommendation 601.

Figure 9:
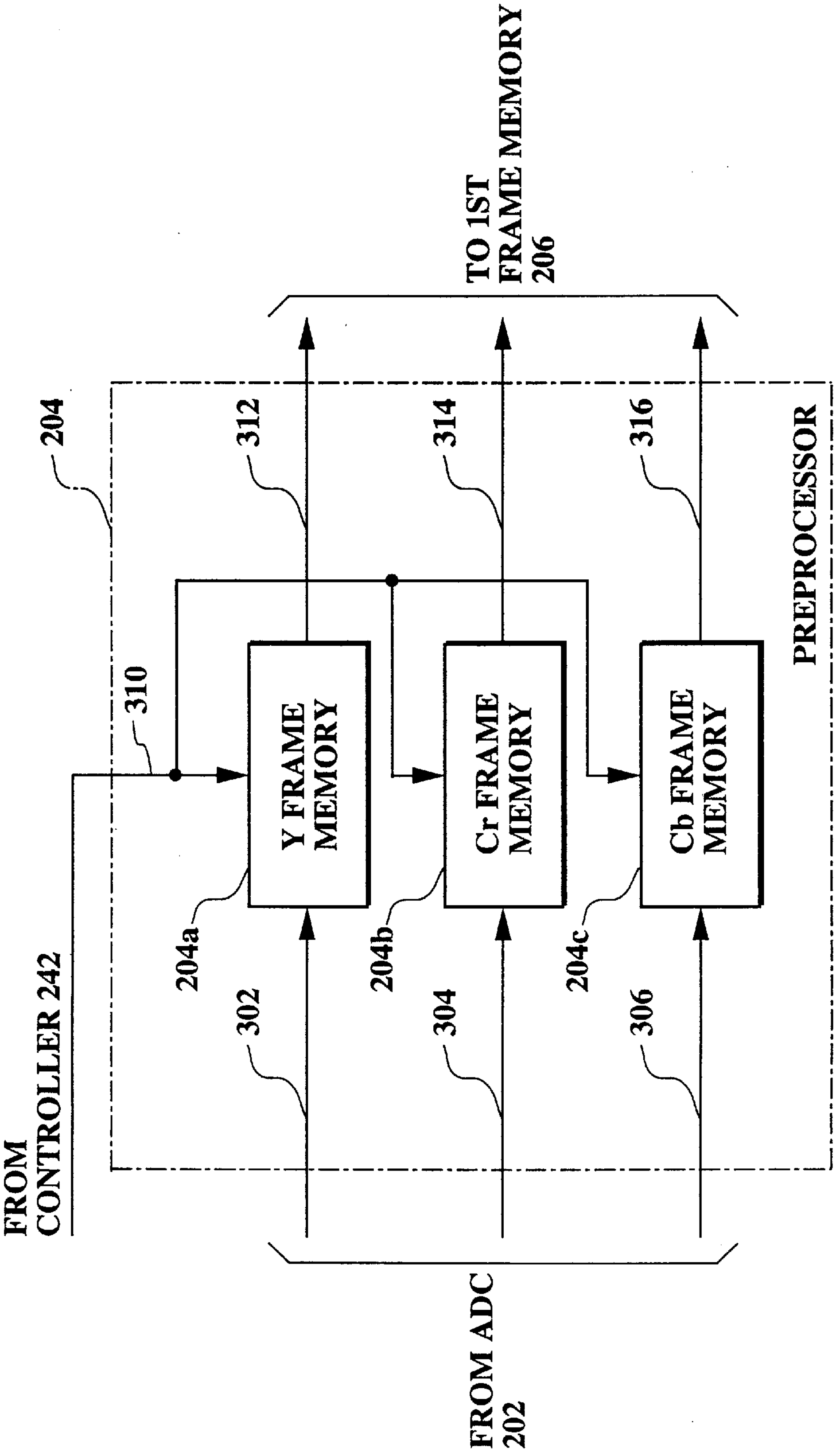
FIG. 9 is a schematic block diagram showing a specific configuration of a preprocessor also included in the circuitry of FIG. 2.

As shown in FIG. 9, the preprocessor 204 has a Y frame memory 204*a*, a Cr frame memory 204*b*, and a Cb frame memory 204*c*. The ADC circuits 202*a*, 202*b* and 202*c* have outputs 302, 304 and 306, respectively. The outputs 302–306 are respectively connected to the inputs of the Y, Cr and Cb frame memories 204*a*–204*c*. It is to be noted that the chrominance signals Cb and Cr are respectively produced by Cb=B (blue)−Y (luminance signal) and Cr=R (red)−Y (luminance signal).

Figure 10:
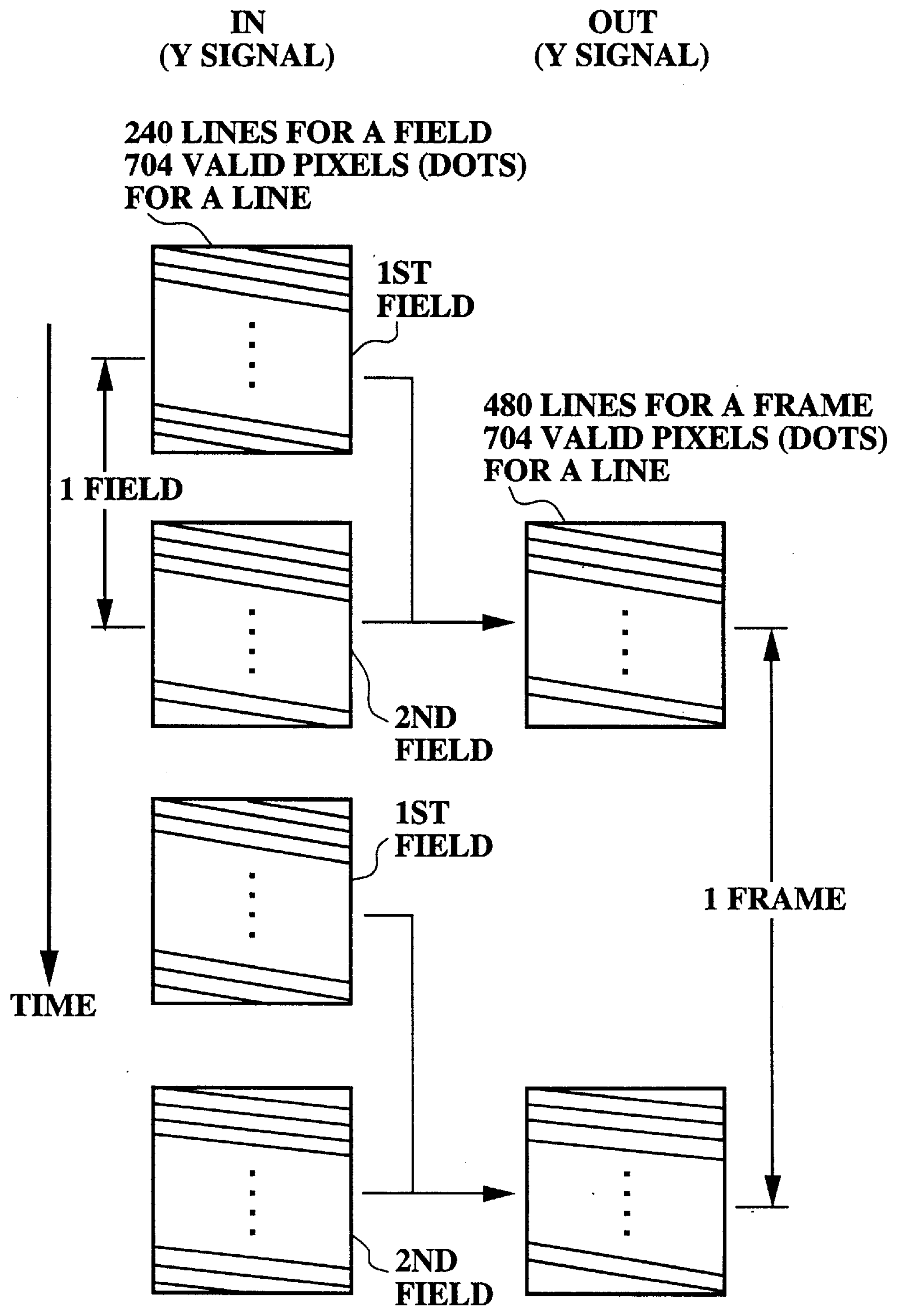
FIG. 10 demonstrates a specific procedure for the preprocessor to deal with a luminance signal.
Figure 11:
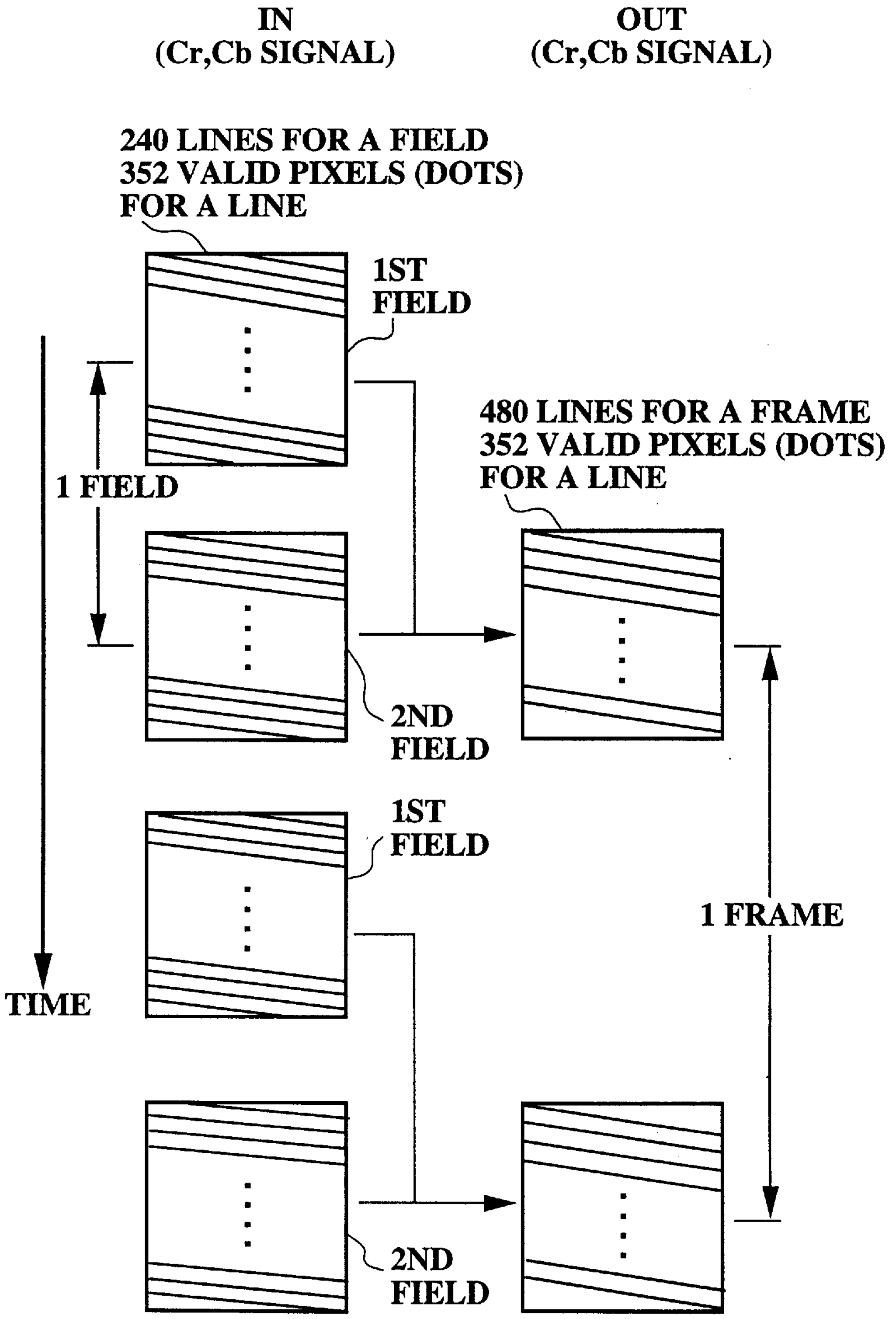
FIG. 11 demonstrates a specific procedure for the preprocessor to deal with two different chrominance signals.

In the embodiment, the preprocessor or signal processing circuit 204 sequentially receives a first and a second field from the ADC 202 at a field period, forms a single frame based on the first and second fields, and then outputs the frame at a frame period. One frame output from the preprocessor 204 has parameters identical with an NTSC format (704 pixels×480 lines) used by MPEG2. Processing to be executed by the preprocessor 204 is demonstrated in FIGS. 10 and 11. While the preprocessor 240 is shown as transforming an NTSC video signal to an NTSC format, it may receive, e.g., a PAL (Phase Alternation Line) video signal and transform it to a PAL format or any other suitable format. The NTSC signal has 525 scanning lines of which 480 scanning lines are valid. The PAL signal has 625 scanning lines of which 576 scanning lines are valid.

Referring to FIG. 9, the Y frame memory 204*a* is implemented by, e.g., a RAM (Random Access Memory) (D (Dynamic) RAM). In the embodiment, the frame memory 204*a* sequentially receives from the ADC circuit 202*a* two fields of Y data, i.e., a first and a second field respectively constituted by odd lines and even lines. The two fields constitute one frame. The one frame of Y data are sequentially written to the frame memory 204*a* in the order of line and read thereoutof in the order of line. The Cr frame memory 204*b* and Cb frame memory 204*c* are identical in construction and operation with the Y fame memory 204*a* except that they receive one frame of Cr data and one frame of Cb data from the ADC circuits 202*b* and 202*c*, respectively. For the writing and reading of the data, the controller 242 feeds a write control signal and a read control signal to the frame memories 204*a*–204*c* via a control line 310. The frame memories 204*a*–204*c* have their outputs 312, 314 and 316 connected to the corresponding inputs of the first frame memory 206, FIG. 2. In the illustrative embodiment, the data are read out frame by frame because the coding device 1 handles one frame as a unit. When one field is dealt with as a unit, the data may be read out frame by frame.

Figure 12:
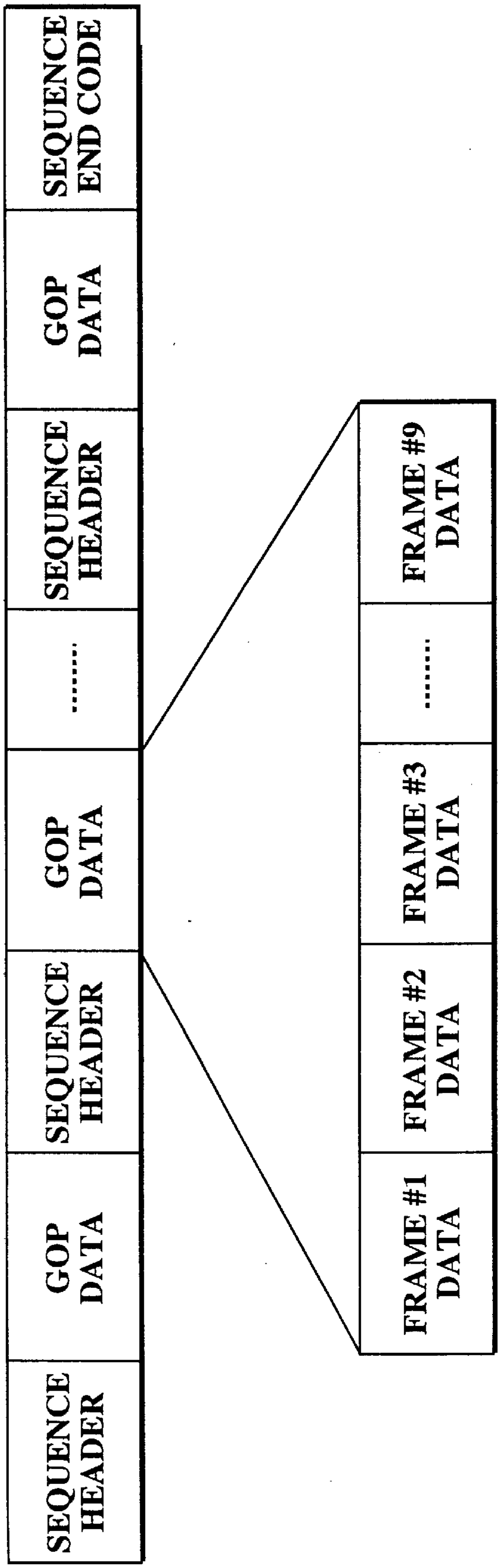
FIG. 12 shows the structure of GOP data particular to the embodiment shown in FIGS. 1 and 2.

In the illustrative embodiment, image data representative of each picture other than I pictures are produced on the basis of the preceding and following picture data, i.e., a single picture does not provide complete information. In addition, for reproduction, storing and broadcasting media need various trick modes including a fast forward mode and a rewind mode. Under these circumstances, the embodiment, like MPEG1 and 2, adopts a structure in which some picture data or frame data are collectively handled as a GOP (Group of Pictures), as shown in FIG. 12. The number of pictures or frames (N) constituting a single GOP is open to choice although the maximum number is around fifteen. In this embodiment, the number N is selected to be nine by way of example. For this reason, the first frame memory 206, FIG. 2, has a capacity capable of accommodating nine frames of data.

The first frame memory 206, implemented as a DRAM in the embodiment, is capable of storing nine frames of data Y, Cr and Cb, as mentioned above. Specifically, a first to a ninth frame memory constitute a frame memory assigned to the data Y. The frame-by-frame Y data output from the preprocessor 204 are sequentially repeatedly written to the first to ninth frame memories in this order. Frame memories assigned to the data Cr and Cb, respectively, may be identical in configuration and operation with the frame memory assigned to the data Y. For the writing of such data, the controller 242 feeds a write control signal to the frame memory 206 via a control line 320. The data stored in the frame memory 206 may be read out at a timing one frame later than the write timing; in the embodiment, the data Y, Cb and Cr may be repeatedly read out in this sequence, and out of the first to ninth frame memories in this order. For the reading of the data, the controller 242 also feeds a read control signal via the control line 320. The data read out in such an order sequentially appear on an output 318. The output 318 of the frame memory 206 is connected to the corresponding inputs of the first and second switches 208 and 212. Again, the data are read out frame by frame because the coding device 1 handles one frame as a unit. When one field is dealt with as a unit, the data may be read out frame by frame.

Figure 13:
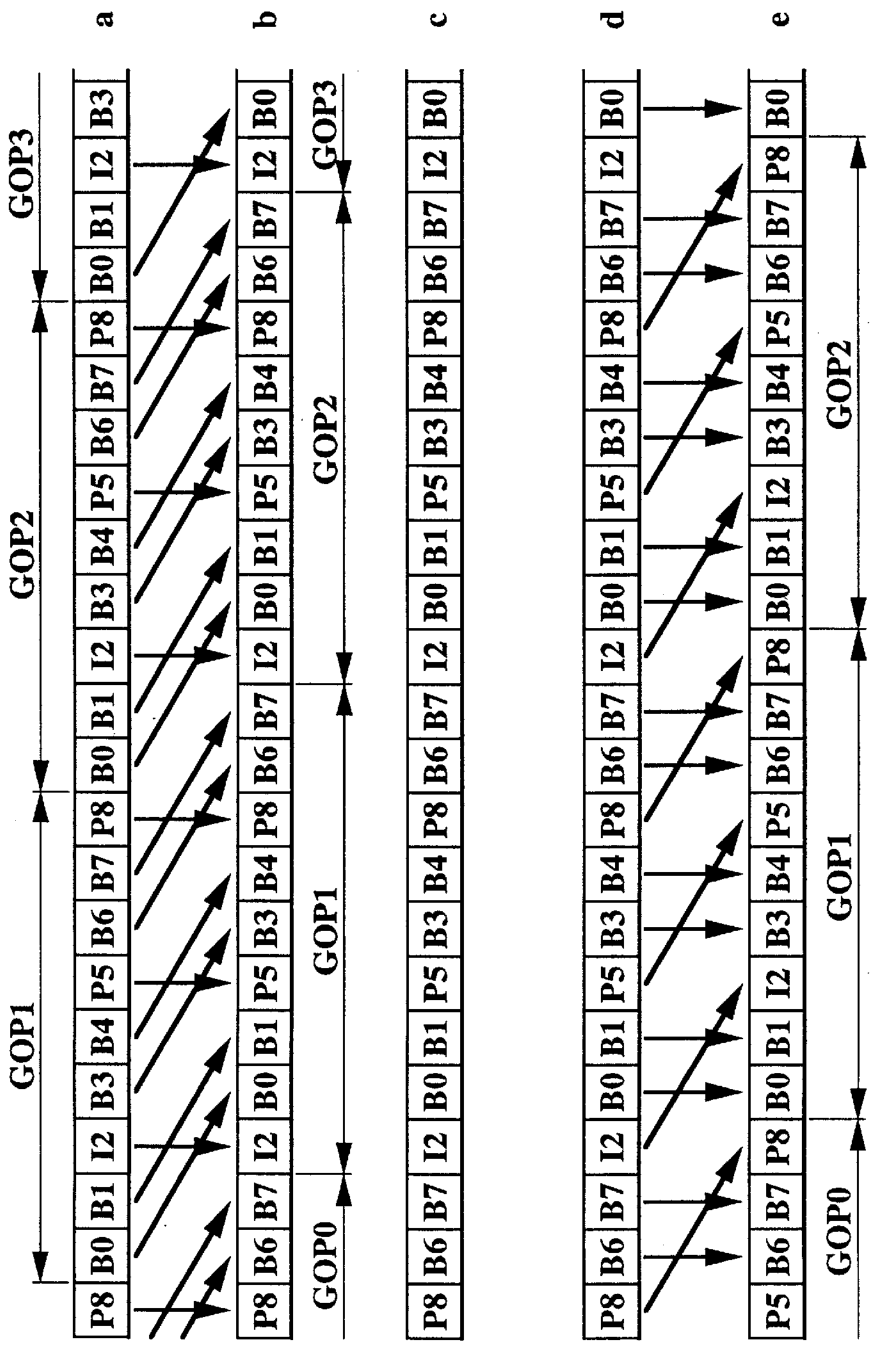
FIGS. 13A–13E show how the coding device and decoding device each process pictures, and the arrangement of pictures.

The first switch 208 selectively connects the input 318 to its output 319 (ON) or disconnects the former from the latter (OFF) under the control of a control signal 322 fed from the controller 242. In the illustrative embodiment, the switch 208 is brought to its ON state when the coding device 1 generates a B picture or brought to its OFF state when the device 1 generates an I picture or a P picture. Specifically, when two frames of consecutive data for generating a B picture, e.g., pictures B0 and B1 or pictures B3 or B4 shown in FIG. 13A are to be read out of the frame memory 206, the switch 208 is brought to its ON state. On the other hand, when a picture for generating an I picture, e.g., I2 or a picture for generating a P picture, e.g., P5 is to be read out of the frame memory 210, the switch 208 is brought to its OFF state. The output 319 of the switch 208 is connected to the input of the second frame memory 210. Therefore, the second frame memory 210 stores two frames of image data for generating a B picture.

While the optimal period (M) at which the I or P picture appears depends on the movement of the moving image, the period M is selected to be "3", as will be seen with reference to FIGS. 13A–13E. That is, two B pictures appear during such a period. The second frame memory 210 therefore has a capacity corresponding to two frames. However, the above period M is only illustrative.

The second frame memory 210 is made up of a Y frame memory, a Cr frame memory, and a Cb frame memory capable of storing two frames of Y, Cr or Db data each, although not shown specifically. The Y frame memory consists of a first and a second frame memory. The two frames of Y data sequentially fed from the first switch 208 are sequentially repeatedly written to the first and second frame memories. This is also true with the Cr and Cb frame memories. For the writing of the data in the memories, the controller 242 delivers a write control signal via a control line 326.

The data are read out of the second frame memory 210 when a B picture is coded. The first B picture, e.g., B0 in FIG. 13A and the next picture B1 are read out of the first and second frame memories, respectively. For the reading of the data out of the memories, the controller 242 delivers a read control signal via the control line 326. The output 324 of the frame memory 210 is connected to the corresponding input of the second switch 212.

The second switch 212 selectively connects one of its two inputs 318 and 324 to its output 330 under the control of a control signal 331 fed from the controller 242. In this embodiment, the switch 212 selects the input 318 when an I or a P picture is to be generated or selects the input 324 when a B picture is to be generated. The output 330 is connected to the input of the subtracter 214.

The illustrative embodiment causes the subtracter 214, which will be described later, to produce a difference between the signal value of a given picture and the signal value of another picture (past picture or future picture as in MPEG1 or 2), i.e., the embodiment adopts a prediction coding scheme. Specifically, the embodiment executes intra-frame prediction coding, forward interframe prediction coding, and interpolation (bidirectional) interframe prediction coding. The intra-frame prediction coding is used to produce an I picture without using data stored in two prediction memories, i.e., the first and second predictors 234 and 236 in the embodiment. The forward interframe prediction coding is used to generate a P picture by using the data stored in the first predictor 234 or the second predictor 236. The interpolation interframe prediction coding is used to generate a B picture by producing a mean of the forward interframe prediction and backward interframe prediction, i.e., by causing the mean circuit 238 to produce a mean of the data output from the first and second predictors 234 and 236. As for a P picture, the intra-frame prediction coding will sometimes be used for portions whose unit is a macroblock which will be described later. Also, as for a B picture, the intra-frame prediction coding, forward interframe prediction coding and backward interframe prediction coding will sometimes be used for portions whose unit is a macroblock.

Assume that an I picture is to be produced, i.e., intra-frame coding is to be executed. Then, in the illustrative embodiment, the subtracter 214 subtracts a data value "0" fed from the fourth switch 240, which will be described, from a data value 330 fed from the frame memory 206 for I picture generation and representative of one picture (e.g., I2, FIG. 13A). The pixel data value "0" does not use the above two prediction memories. In this case, the data received from the memory 206 are directly fed out via the output 336. If desired, the subtracter 214 may directly deliver the input data 330 via its output 336, omitting the subtraction.

To general a P picture, i.e., to execute the forward interframe coding, the subtracter 214 receives from the frame memory 206 a data value 330 for the generation of a P picture and representative of one picture (e.g. P5, FIG. 13A). The subtracter 214 subtracts from the data value 330 a data value 332 received from the first predictor 234 or the second predictor 236 via the fourth switch 240 and appeared a preselected number of frames later (I2, FIG. 13A, appeared three frames later). This subtraction is effected with pixels of the same position. The result of subtraction appears on the output 336.

Further, to generate a B picture, i.e., to execute the bidirectional prediction coding, the subtracter 214 receives from the frame memory 206 a data value 330 for the generation of a B picture and representative of one picture (e.g. B3, FIG. 13A). The subtracter 214 subtracts from the data value 330 a data value 332 received from the mean circuit 238 via the fourth switch 240, i.e., a mean of a picture appeared a preselected number of frames earlier (P5, FIG. 13A, appeared two frames earlier) and a picture appeared a preselected number of frames later (I2, FIG. 13A, appeared one frame later). This is also effected with pixels of the same position. The result of subtraction appears on the output 336. In any case, the subtraction is controlled by a control signal 334 fed from the controller 242.

Figure 14:
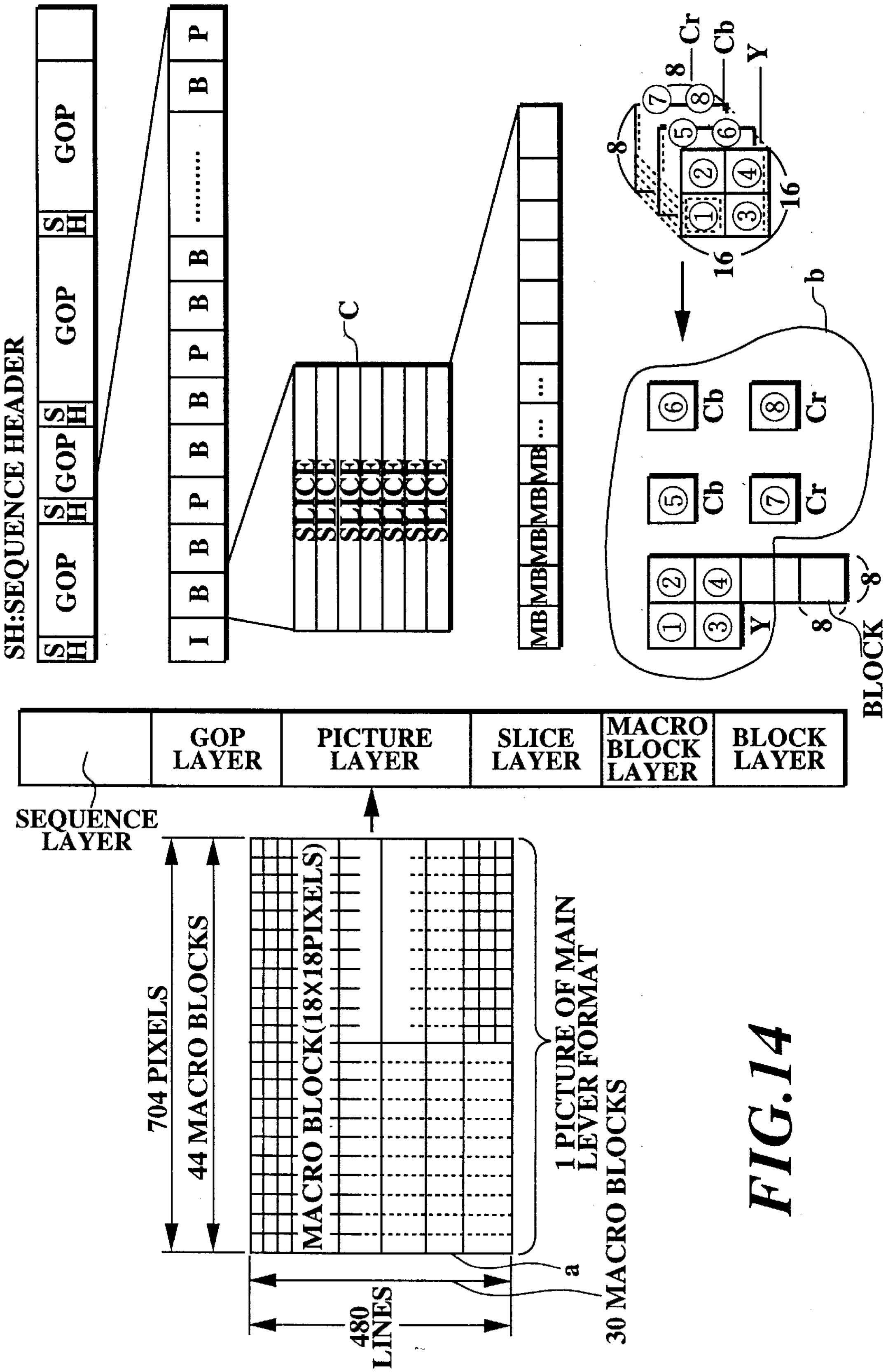
FIG. 14 shows the hierarchical structure of image data particular to the embodiment shown in FIGS. 1 and 2.

More specifically, for the above subtraction, a macroblock (MB) a (16 pixels×16 pixels) included in one picture, as shown in FIG. 14, is dealt with as a unit. As also shown in FIG. 14, each macroblock is subdivided into blocks each having 8×8 pixels. Spatial information compression using DCT, which will be described later, is executed by using such a block as a unit. DCT is applied to four blocks of the luminance signal Y ($Y_1$, $y_2$, $Y_3$ and $Y_4$), two blocks of the chrominance signal Cr ($Cr_1$ and $Cr_2$), and two blocks of the chrominance signal Cb ($Cb_1$ and $Cb_2$). The output 336 of the subtracter 214 is connected to the input of the DCT circuit 216.

The DCT circuit 216 includes a memory, not shown, for temporarily storing the above eight blocks of pixel data constituting a single macroblock. The DCT circuit 216 writes, under the control of a control signal 338 fed from the controller 242, such macroblocks of pixel data sequentially received from the subtracter 214 in the memory. Also, Linder the control of the control signal 338, the DCT circuit 216 reads the pixel data out of the memory block by block. At the same time, the DCT circuit 216 executes DCT, or bidimensional orthogonal transform, with the individual block of pixel data. As a result, the image data lying in the space domain are transferred to data lying in the frequency domain, i.e., transform coefficients. The transform coefficients are fed to the quantizer 218 via an output 340. In this case, the transform coefficients $Y_1$, $Y_2$, $Y_3$, $Y_4$, $Cb_1$, $Cb_2$, $Cr_1$ and $Cr_2$ are sequentially delivered in this order.

The quantizer 218 normalizes the transform coefficients of the individual block tinder the control of a control signal 342 fed from the controller 242, i.e., sequentially divides the transform coefficients by a quantizing step, from a low frequency component to a high frequency component. The normalized transform coefficients are sequentially applied to the variable length coder 220 and dequantizer 226 via an output 344. The dequantizer 226 plays the role of a local decoder.

The variable length coder 220 transforms the normalized transform coefficients to run-lengths and huffman codes under the control of a control signal 346 fed from the controller 242. The resulting data appear on an output 348. In this manner, the DCT circuit 216 performs adaptive DCT with the image data. The output 348 is connected to the input of the multiplexer 222.

The demultiplexer 222 includes a memory circuit 222*a* (DRAM in the embodiment) necessary for scrambling the variable length code data received from the variable length coder 220. The memory circuit 222*a* has a capacity great enough to store two frames of data Y, Cb and Cr although it may be capable of storing three or more frames. Specifically, in the embodiment, the memory circuit 222*a* is implemented as a first and a second frame memory. The coded data Y, Cb and Cr sequentially received from the coder 220 are repeatedly written to the first and second frame memories in this order. While the data are written to the first frame memory, the data are read out of the second memory. Likewise, while the data are written to the second frame memory, the data are read out of the first frame memory. Such a procedure is controlled by a write/read control signal fed from the controller 242 via a control line 354.

More specifically, in the illustrative embodiment, the data are written to the above frame memories in the order of, e.g., slice (see c, FIG. 14) on the picture and in the order of macroblocks constituting the individual slice. The data are read out of the frame memories in a preselected order of slice and in the order of macroblock constituting the slices. In this case, each slice is a minimum unit in the form of a sequence of data including a slice start code (SSC, FIG. 26C). In this embodiment, the sequence of data is a strip of macroblocks having a width of sixteen pixels. The slice does not extend over adjoining lines in the MPEG2 format or over adjoining pictures (frames) in the MPEG1 format. The writing and reading procedures will be described in detail with reference to FIGS. 15 and 16.

Figures 15, 16:
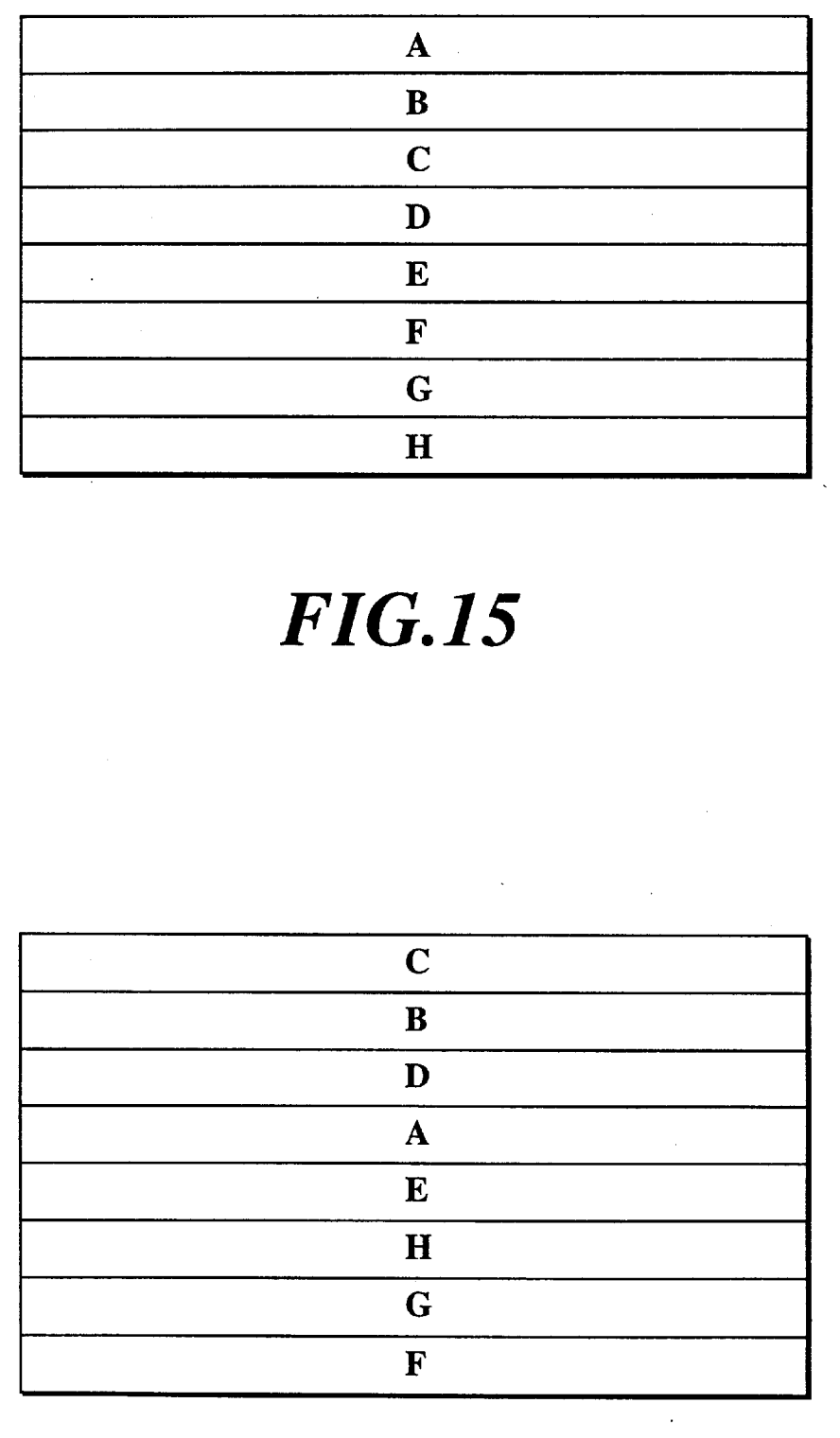

For the simplicity of description, FIG. 15 shows a single MPEG2 picture consisting of eight consecutive slices or lines. When the picture of FIG. 15 is scrambled, a picture shown in FIG. 16 and consisting of eight slices or lines are output from the coding device 1. In this case, the data Y, Cb and Cr are sequentially written to the frame memories from the top slice to the bottom slice of FIG. 15, i.e., slices A, B, C, D, E, F, G and H and in the order of macroblocks. The data Y, Cb and Cr are sequentially read out of the frame memories in the order of slices C, B, D, A, E, H, G and F shown in FIG. 16 and in the order of macroblocks constituting the individual slice. The scrambled signal is fed to the monitor 5 via the reproducing device 2 which will be described. However, unless the scrambled signal is descrambled by the reproducing device 2, the expected picture does not appear on the monitor 5 because the position of the picture output from the device 2 differs from that of the picture input to the device 1.

The above scrambling method replaces the positions of the slices either randomly or in a preselected order. Another specific scrambling method will be described with reference to FIGS. 17 and 18. Briefly, the alternative method divides each slice into two or more strings of macroblocks by a cut point or cut points, and then replaces the strings in the same slice in the horizontal direction or replaces them with the first (left of a picture), intermediate or last string of macroblocks of a different slice, as will be described hereinafter.

Figure 17:
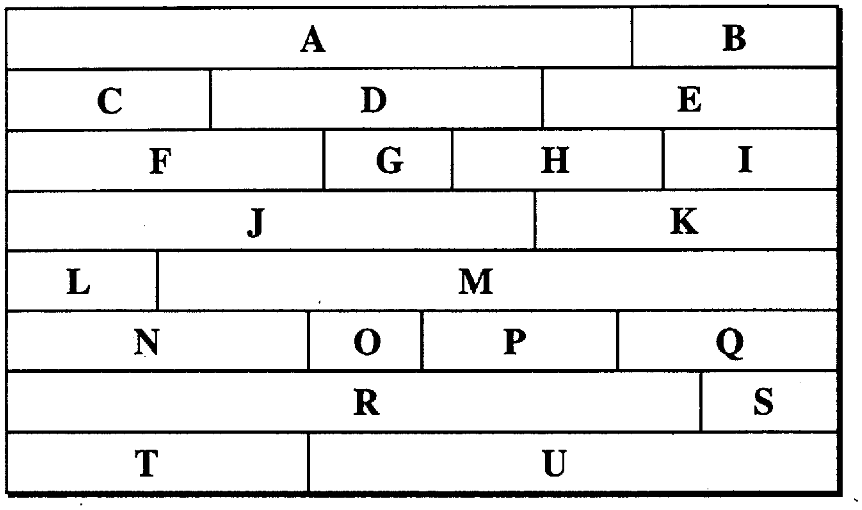
FIG. 17 shows other specific positions of the slices not subjected to scrambling.
Figure 18:
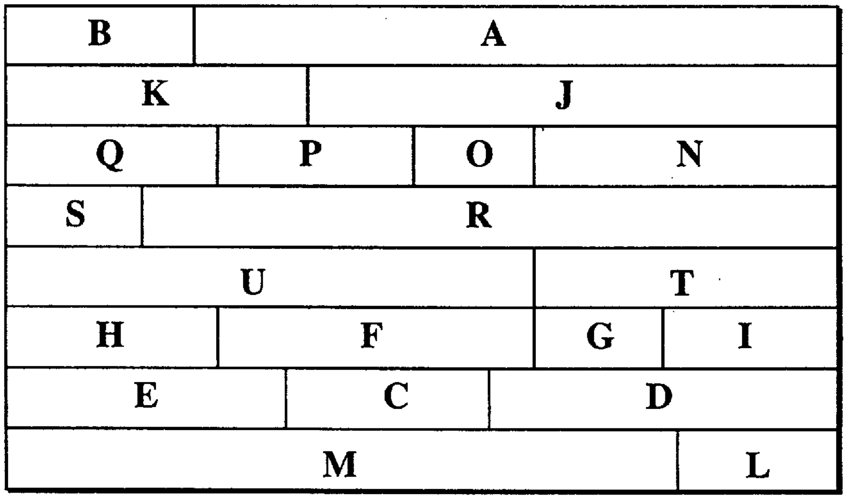
FIG. 18 shows other specific positions of the slices subjected to scrambling.
Figure 19:
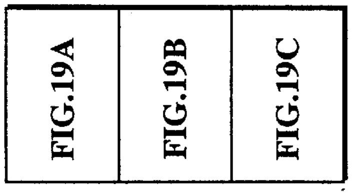
FIGS. 19A, 19B and 19C show, when combined as shown in FIG. 19, a part of the hierarchical structure of data output from the coding device shown in FIGS. 1 and 2.
Figure 19A:
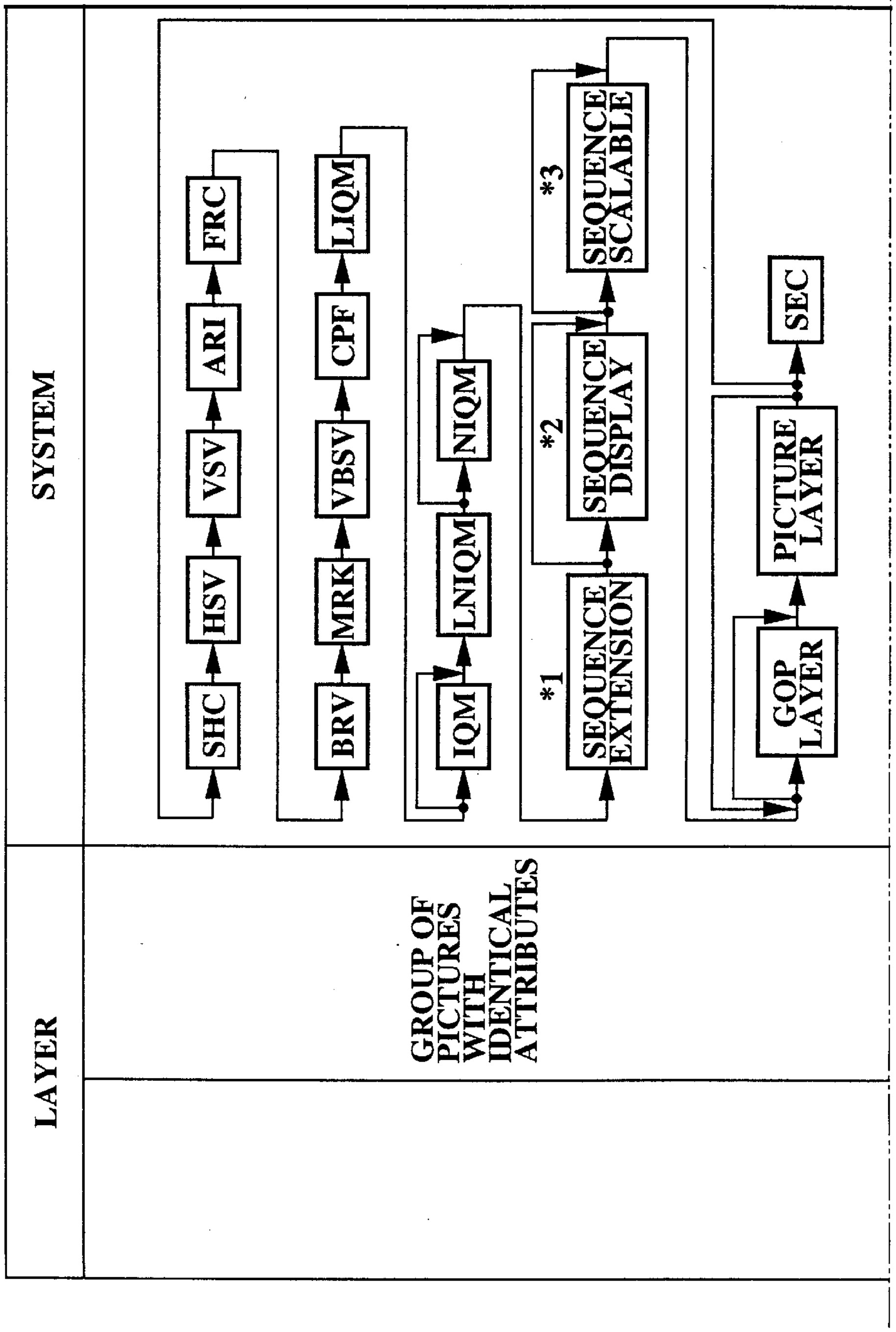
Figure 19B:
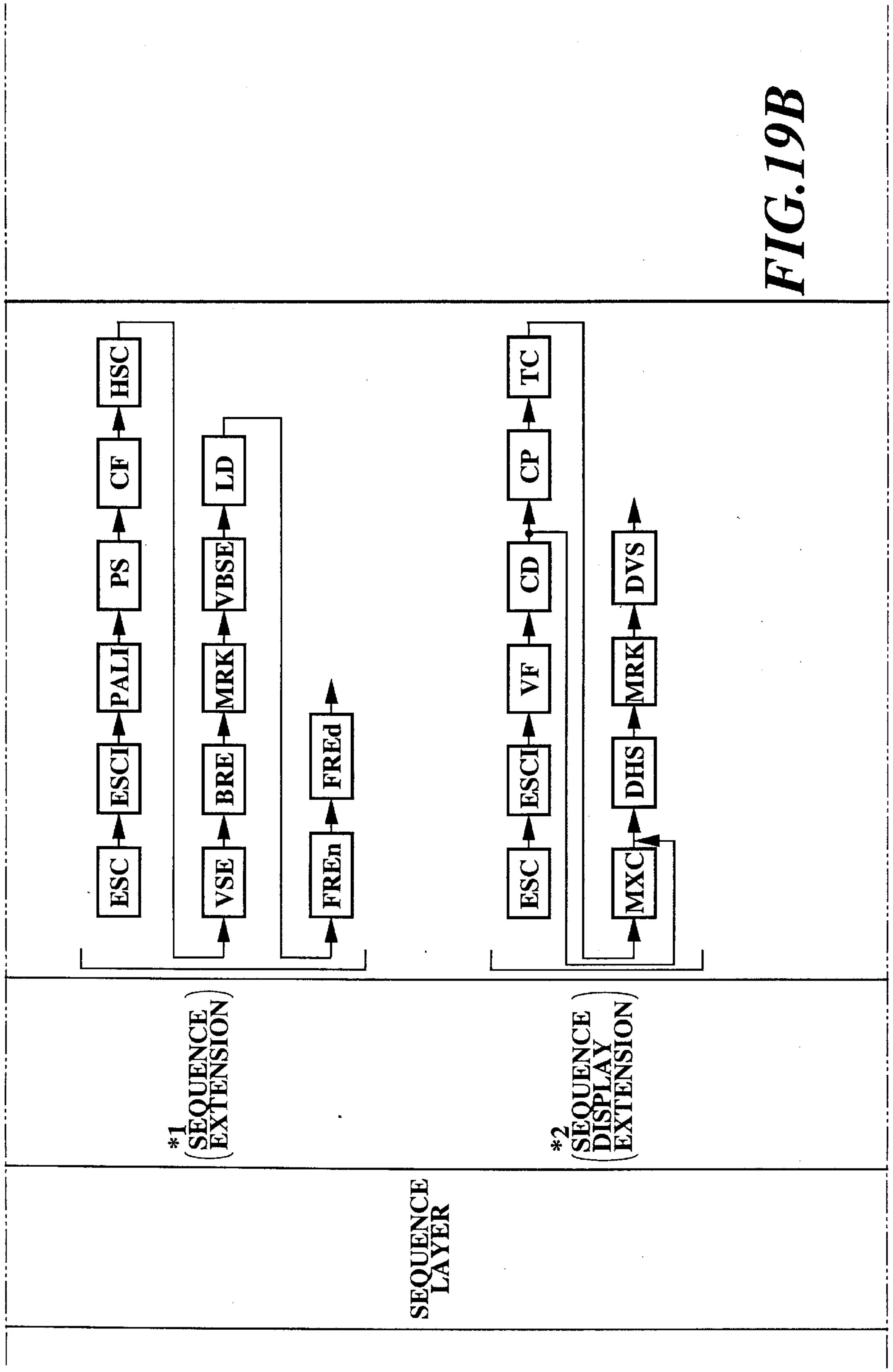
Figure 19C:
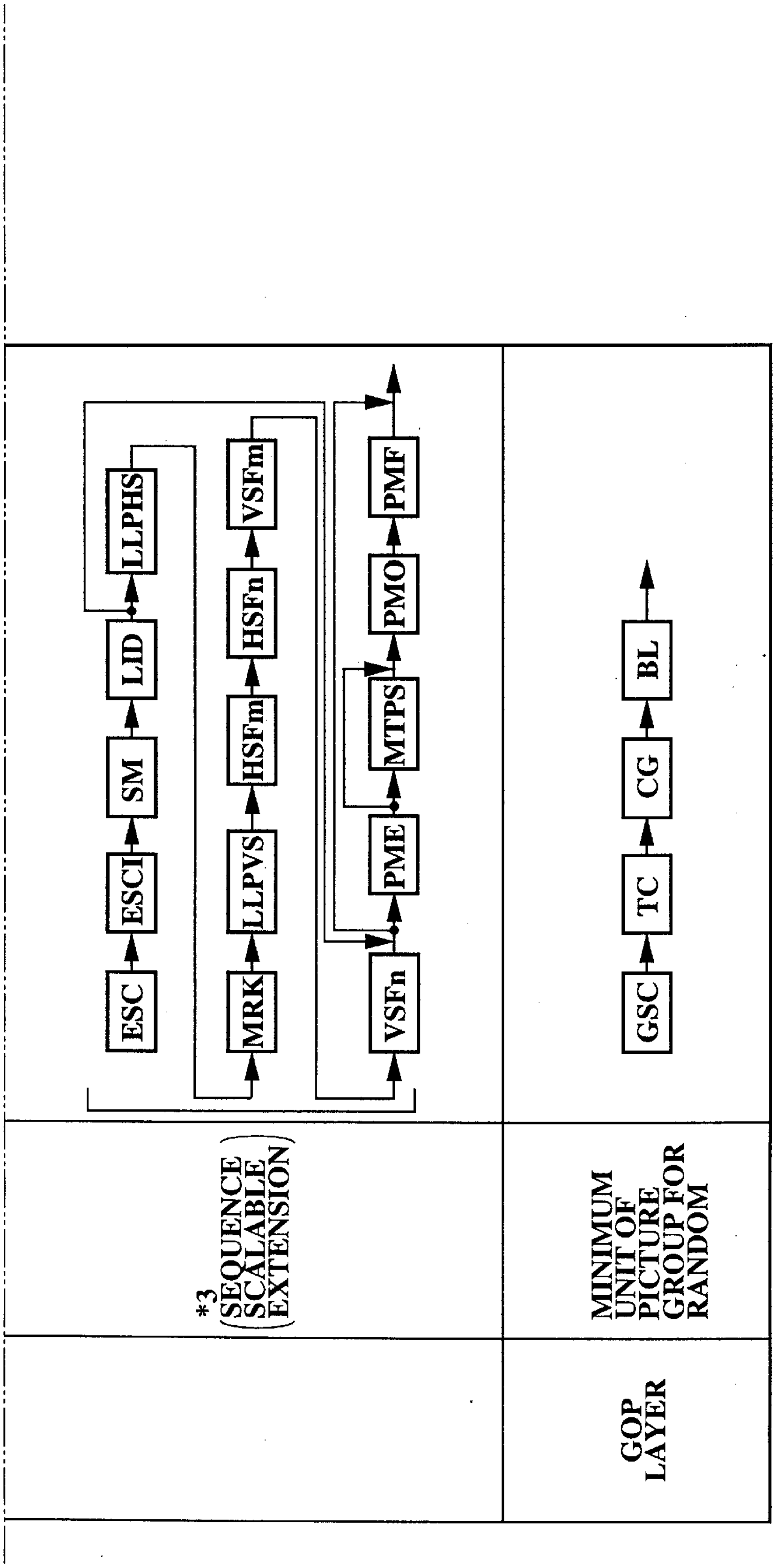
Figure 20B:
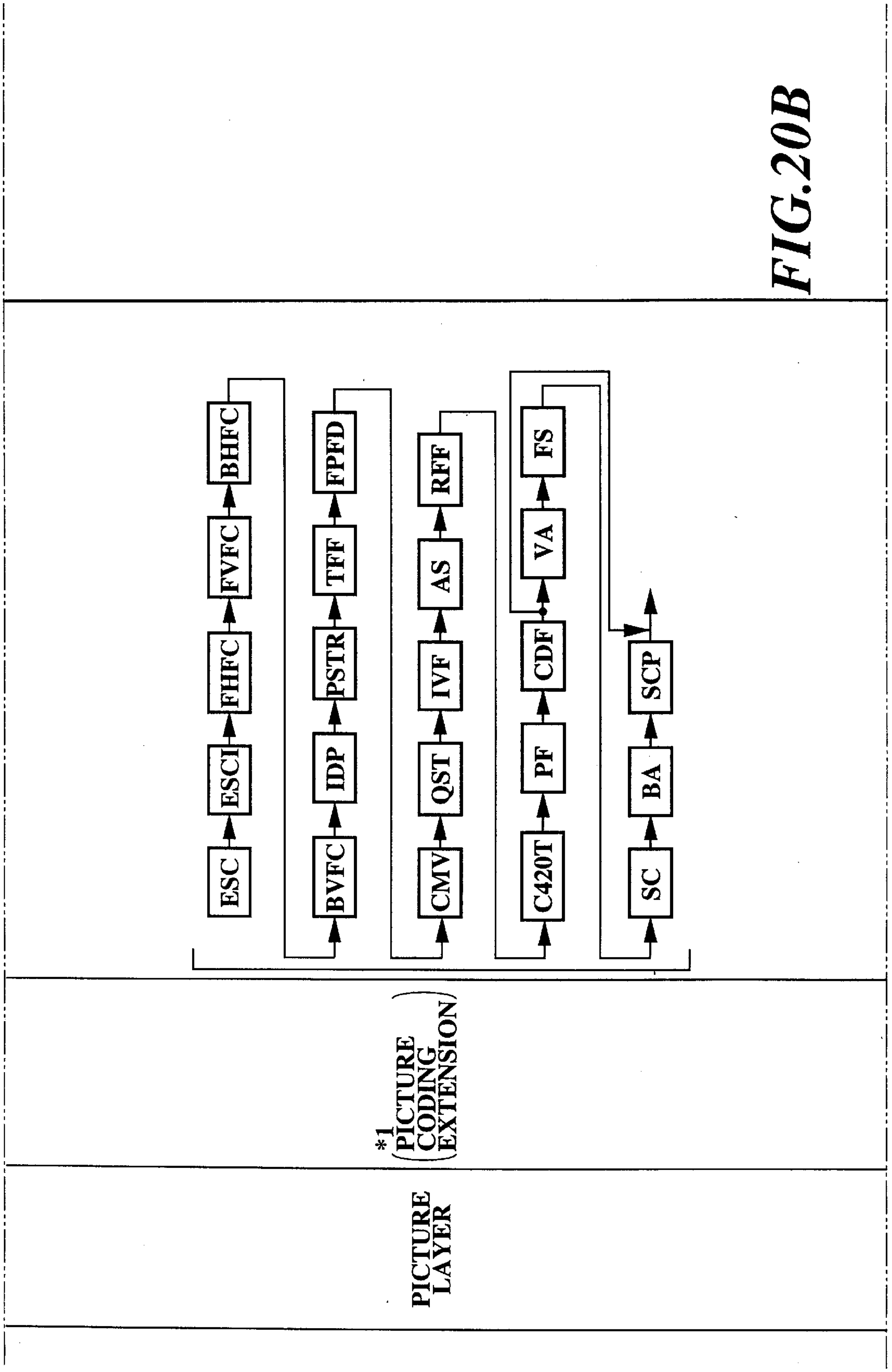
Figure 20C:
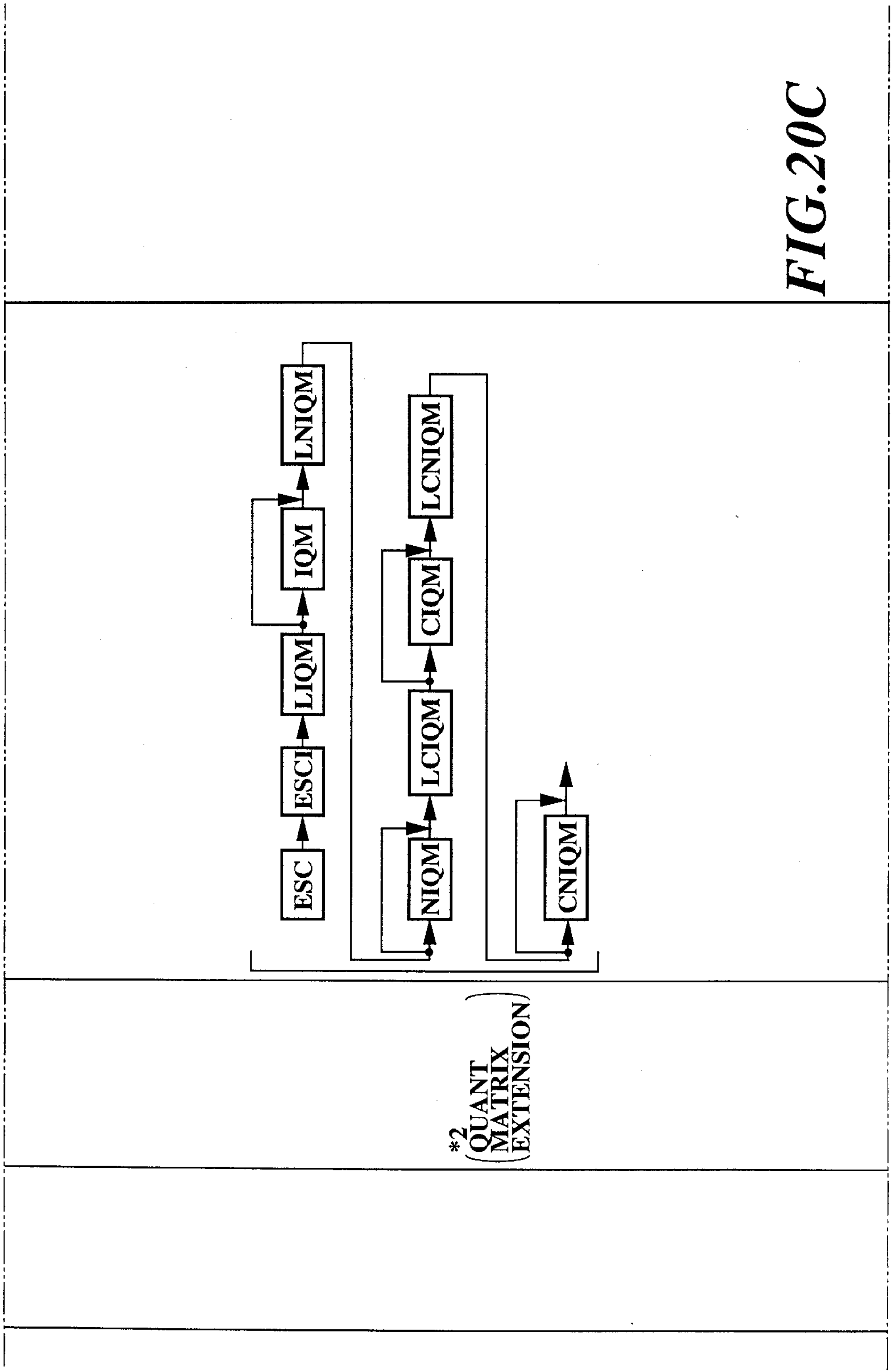
Figure 20D:
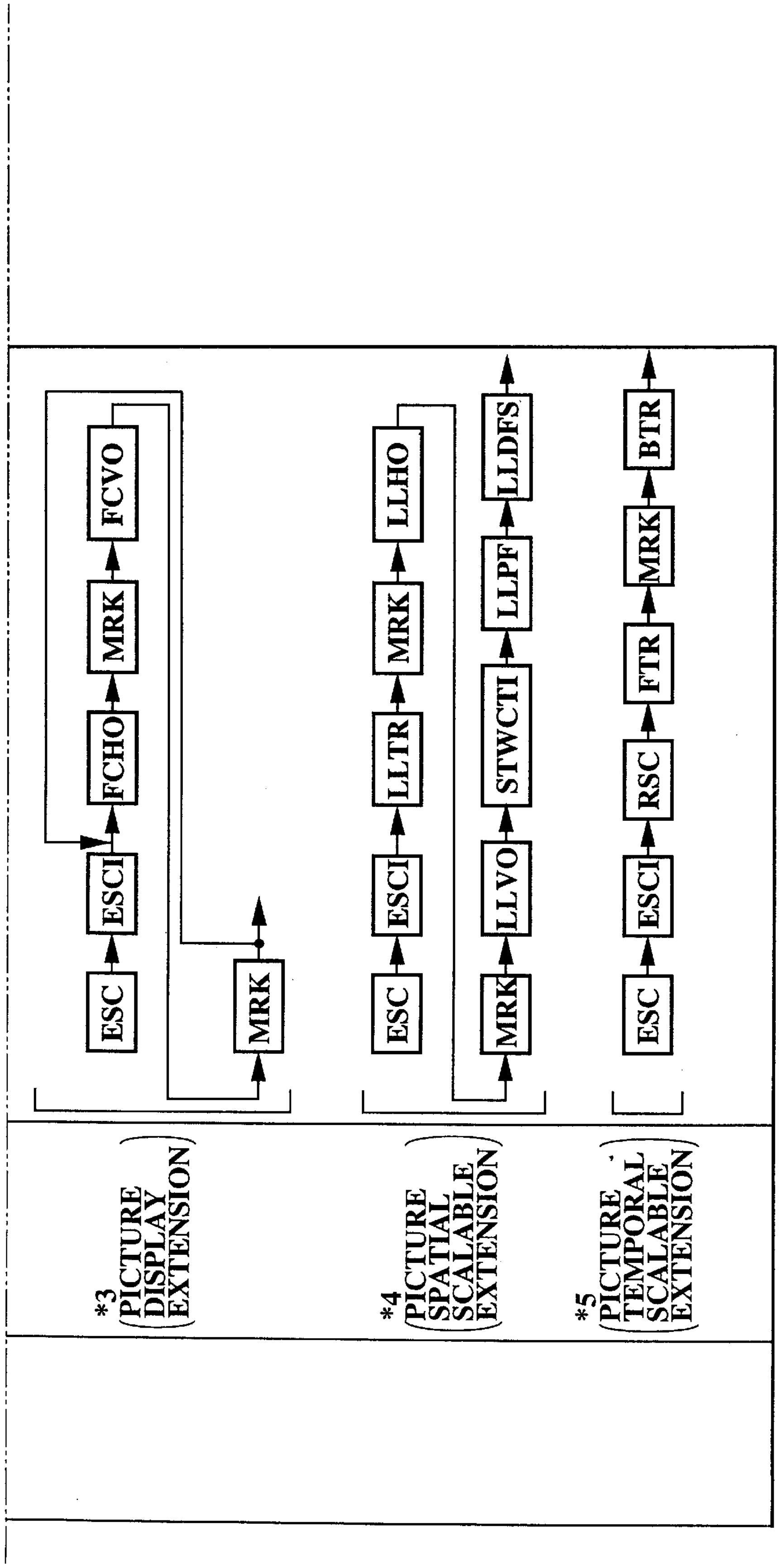
Figure 21B:
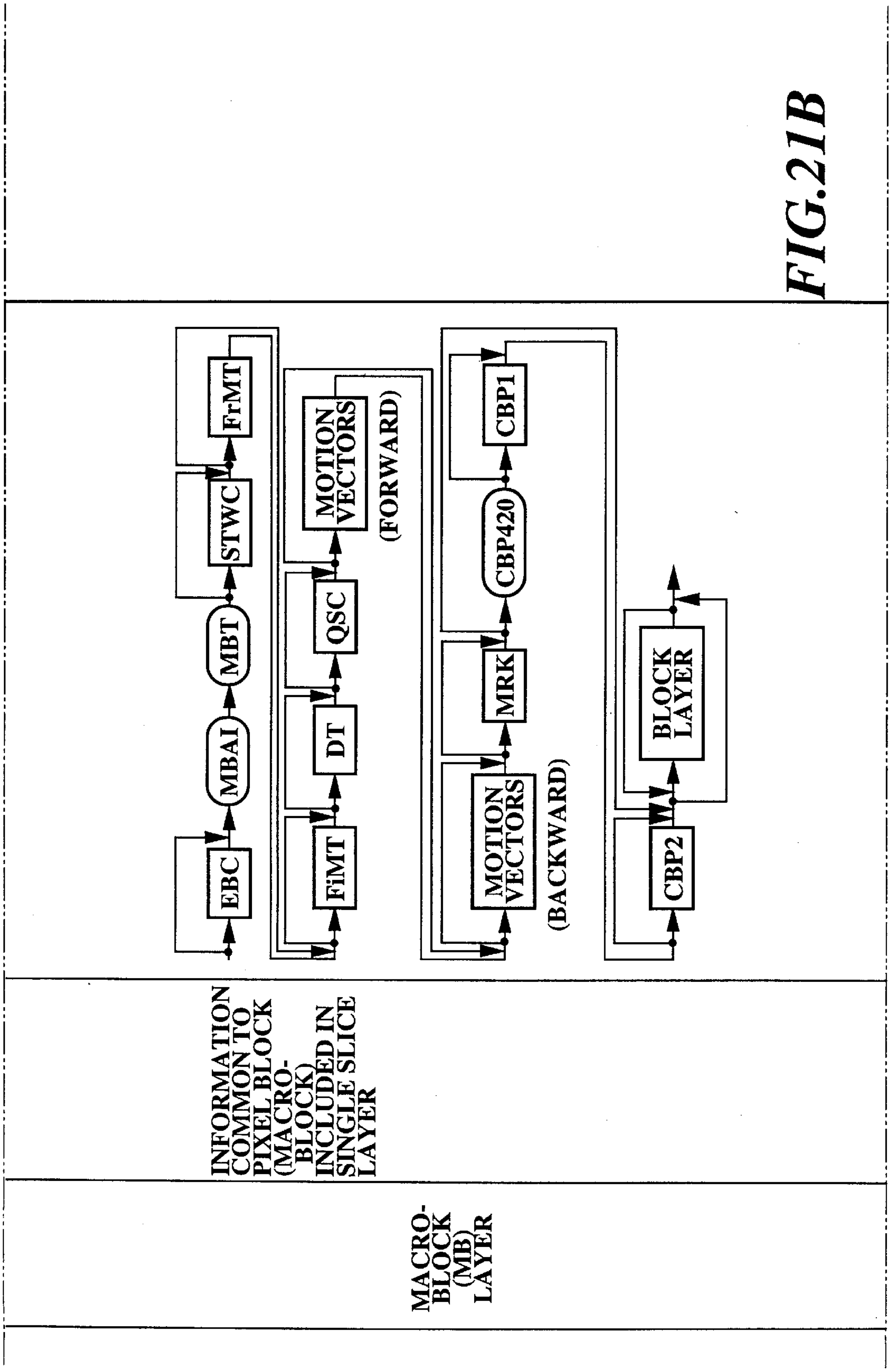
Figure 21C:
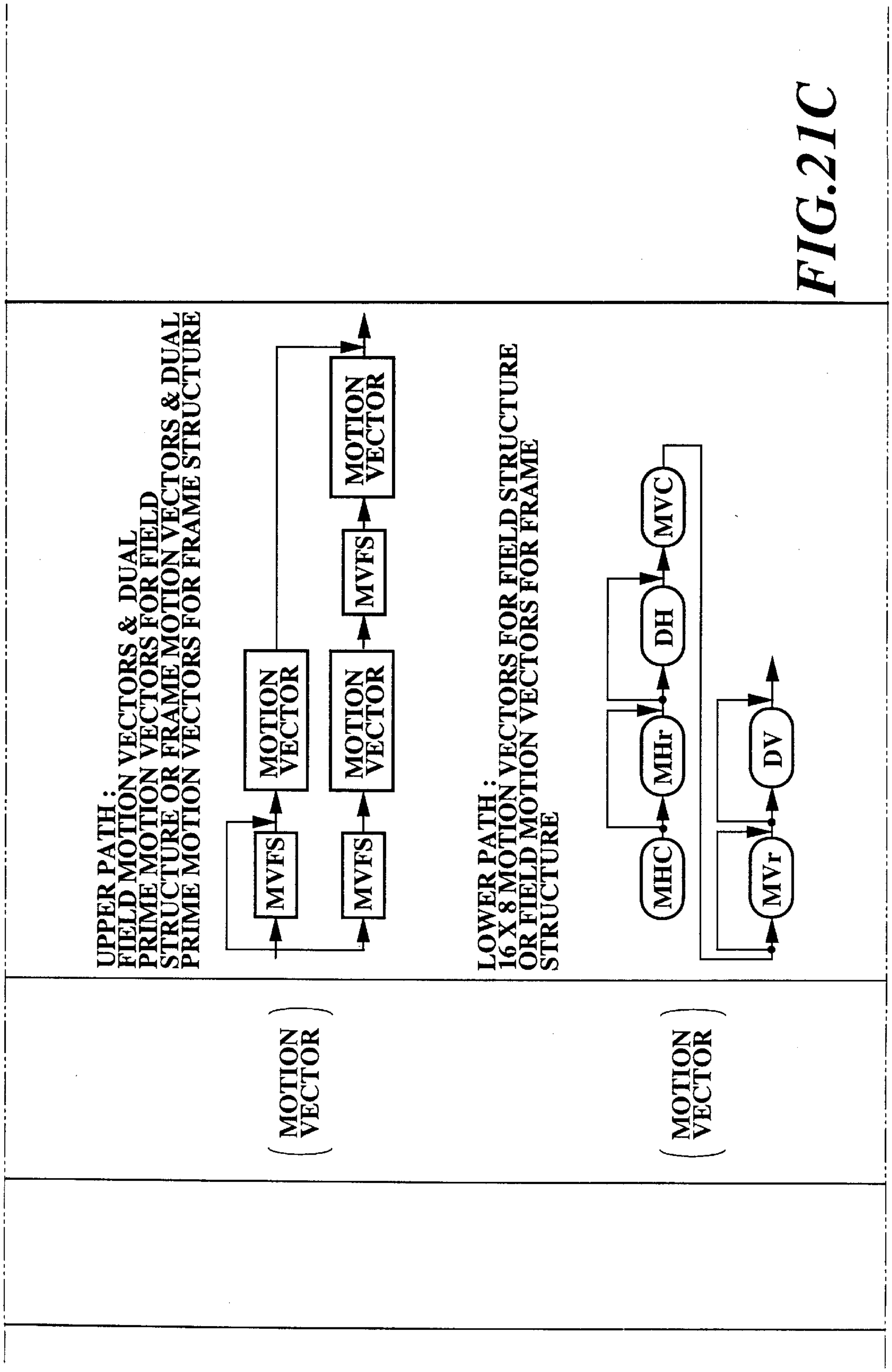
Figure 21D:
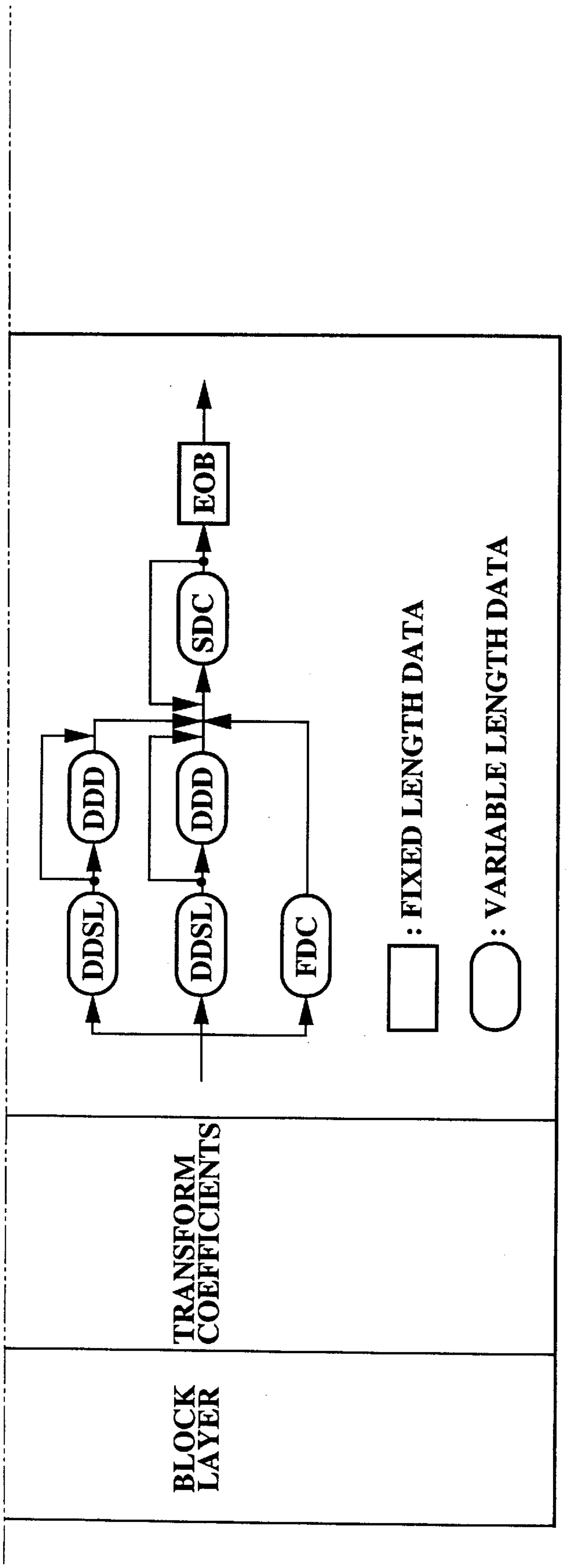

For the simplicity of description, FIG. 17 shows a single MPEG2 picture output from the preprocessor 204 and having eight slices or lines divided by a cut point or cut points each. When the picture of FIG. 17 is scrambled, a single picture having eight slices or lines shown in FIG. 18 is output from the coding device 1. As shown in FIG. 17, the first or top slice has strings A and B of macroblocks divided by a single cut point. The second slice has strings C, D and E of macroblocks divided by two cut points. Likewise, the third, fourth, fifth, sixth, seventh and eight slices respectively have strings of macroblocks F, G, H and I, strings of macroblocks J and K, strings of macroblocks L and M, strings of macroblocks N, O, P and Q, strings of macroblocks R and S, and strings of macroblocks T and U. As shown in FIG. 18, the scrambled picture has the first slice having B and A, the second slice having K and J, the third slice having Q, P, O and N, the fourth slice having S and R, the fifth slice having U and T, the sixth slice having H, F, G and I, the seventh slice having F, C and D, and the eighth slice having M and L.

The data Y, Cb and Cr are sequentially written to the frame memories in the order of strings A–U constituting the picture shown in FIG. 17 and in the order of the macroblocks constituting the strings A–U. The data Y, Cb and Cr are sequentially read out of the frame memories in the order of strings B, A, K, J, Q, P, O, N, S, R, U, T, H, F, G, I, E, C, D, M and L and in the order of macroblocks constituting such strings. A signal output from the coding device 1 and different in order from the signal input to the device 1, i.e., a scrambled signal is delivered to the monitor 5 via the reproducing device 2. However, unless the scrambled signal is descrambled by the reproducing device 2, the expected picture does not appear on the monitor 5 because the position of the picture output from the device 2 differs from that of the picture input to the device 1, as stated earlier.

If desired, the above two scrambling schemes may be used in combination and may be applied even to MPEG1. If the signal input to the recording device 1 is not scrambled, then the data Y, Cb and Cr may be read out of the frame memories in the same order as they have been written. Further, desired one of such three different scrambling modes may be selected on a scramble mode switch, not shown.

The multiplexer 222 includes a register having a fixed bit length, e.g., eight bits. The variable length coded data read out of the memory circuit 222*a* are written to the register. The register therefore functions to store eight bits of data. The multiplexer 222 additionally functions to confine the amount of codes of each block in a preselected range on the basis of a bit distribution matching the characteristic of a picture. Specifically, when a certain block consisting of DC components and AC components, i.e., image data has a total amount of data exceeding a preselected amount, the multiplexer 222 discards the excess data. The multiplexer 222 packs, under the control of a control signal 354 fed from the controller 242, the image data having the preselected length in the same order as they have been input. Subsequently, the multiplexer 222 multiplexes the image data in a preselected position of a video bit stream structure identical with the MPEG2 structure and shown in FIGS. 19A through 21D. The contents of the abbreviations in FIGS. 19A through 21D are shown in FIGS. 22A through 28B.

Further, the multiplexer 222 multiplexes, under the control of the control signal 354, various kinds of attribute signals received from the controller 242 via a control line 356 in preselected positions shown in FIGS. 19A through 21D. The attribute signals are implemented as code values having a fixed length and representative of, e.g., aspect ratios, picture types and slice start codes (including information indicative of the positions of slices in the vertical direction), or code values having a variable length and representative of, e.g., macroblock addresses and macroblock types. In addition, the multiplexer 222 multiplexes, under the control of the control signal 354, vector values received from the first predictor 234 and/or the second predictor 236 via a signal line 350 or 352 in a preselected position.

Particularly, in the illustrative embodiment, the control signals matching the image data and including the attribute signals are generated not in the order in which the image data are read out of the memory circuit 222*a*, but in the order in which they are written to the memory circuit 222*a*. Therefore, the control signals and the image data are not multiplexed in a pair, so that they are successfully scrambled.

In the embodiment, when the operator presses the button of the scramble button circuit 244, the control circuit 242 sends a synchronizing code representative of the start of user data to the multiplexer 222 via the signal line 356. The multiplexer 222 multiplexes the synchronizing code in a position UDSC (User Data Start Code) included in a sequence layer. At the same time, the multiplexer 222 multiplexes a code representative of the execution of scrambling in a preselected position in a UD (User Data) area following the UDSC.

Assume that a picture is scrambled slice by slice. Then, when the button of the button circuit 244 is pressed, the controller 242 sends codes representative of the positions, in the horizontal direction, of each slice occurred before and after replacement to the multiplexer 222 via the signal line 356. In response, the multiplexer 222 multiplexes such codes in the UD area, in this embodiment after the code representative of the execution of scrambling. On the other hand, assume that each slice is scrambled on a macroblock basis. Then, the multiplexer 222 multiplexes, e.g., codes representative of the positions, in the vertical and horizontal directions, of the individual string of macroblocks occurred before and after replacement, and codes representative of the number of macroblocks constituting the string in the UD area, in this embodiment after the code representative of the execution of scrambling. It is to be noted that multiplexing positions other than the UDSC and UD of the sequence layer may be selected so long as they are selected beforehand in accordance with the system.

The control data and image data multiplexed by the multiplexer 222 in the preselected areas of the frame format matching MPEG2 are fed out via the output 112 included in the multiplexer 222. The signal 112 is sent to the transmitter/receiver 4 via the output terminal DOUT. As a result, the signal 112 is digitally broadcast via a satellite.

On the other hand, the dequantizer 226 multiplies the normalized data received from the quantizer 218 via a signal line 344 by coefficients identical with the quantizing coefficients, thereby dequantizing the normalized data. The dequantized data appear on an output 364. The dequantization is effected under the control of a signal fed from the controller via a control line 366. The output 364 is connected to the input of the inverse DCT circuit 228.

The inverse DCT circuit 228 transforms the dequantized data by bidimensional inverse orthogonal transform, combines a plurality of blocks based on the inversely transformed data, and thereby produces image data representative of a macroblock. The macroblock of image data appears on an output 368. Such transform is effected under the control of a signal fed from the control circuit 242 via a control line 370. The data output from the inverse DCT circuit 228 are sent to the adder 230.

The adder 230 adds, under the control of a control signal 374 fed from the controller 242, the pixel data received from the inverse DCT circuit 228 and pixel data corresponding to it and received from the fourth switch 240 via a signal line 332. The resulting sum data appears on an output 372. The sum data is fed to the corresponding input of the third switch 232.

The third switch 232 has its input 372 selectively connected to one of two outputs 376 and 378 by a control signal 374 fed from the controller 242. In the illustrative embodiment, the input 372 is connected to the outputs 376 and 378 alternately. The outputs 376 and 378 are respectively connected to the input of the first predictor 234 and the input of the second predictor 236.

The predictors 234 and 236 each has memory circuit and a motion correcting circuit, although not shown specifically. The memory circuits of the predictors 234 and 236 are implemented as, e.g., DRAMs, and each receives one frame of image data for prediction based on the future (backward prediction) or on the past (forward prediction) from the adder 230 via the third switch 232.

The motion correcting circuits each receives via a signal line 330 a macroblock to be coded, and reads a macroblock most resembling the received macroblock out of the associated memory circuit. For this purpose, the correcting circuit shifts the macrobicok by fifteen pixels in both directions (±15) in the horizontal and vertical directions. The most resembling macroblocks appear on outputs 384 and 386. Further, the motion correcting circuits each includes a computing section for determining a motion vector on the basis of the positional relation between the received macroblock and the resembling macroblock. The motion vectors appear on outputs 350 and 352. To determine motion vectors, either one of the full-scale search and tree search may be used. The predictors 234 and 236 perform the above operation under the control of control signals fed from the controller 242 via control inputs 382 and 388.

The mean circuit 238 receives the data for forward prediction from, e.g., the first predictor 234 via its input 384 and receives the data for backward prediction from the second predictor 236 via its input 386. The mean circuit 238 computes a mean value (interpolation) of the two received data and produces it on its output 390. For example, the mean circuit 238 adds the two data and then divides the resulting sum by 2.

The fourth switch 240 has four inputs 384, 386, 390 and 392 selectively connected to an output 332 by a control signal 394 fed from the controller 242. The input 384 or 386 is selected when a P picture is to be generated. The inputs 390 and 392 are respectively selected when a B picture is to be generated and when an I picture is to be generated. The input 392 is connected to ground, i.e., provides a data value "0". The output 332 is connected to the corresponding input of the subtracter 214.

The scramble button circuit 244 is one of characteristic features of the coding device 1, as stated earlier. The button of the button circuit 244 is pressed when, e.g., the operator desires to scramble the moving picture output from the camera 3. The button circuit 244 produces an output 396 which, e.g., goes low (logical ZERO) when the button is pressed or goes high (logical ONE) when it is not pressed The output 396 is delivered to the corresponding input of the controller 242.

The controller 242 controls and manages the above various sections of the coding device 1 and may advantageously be implemented as a processing system. The controller 242 has an input 108 connected to the synchronizing signal input terminal SYIN of the coding device 1 by a signal line 108. The controller 242 generates the various control signals based on the synchronizing signals and delivers them to the various sections of the coding device 1, as stated previously.

When the output of the button circuit 242 is in a high level, meaning that the moving picture is not to be scrambled, the controller 242 produces on its output 354 a read control signal identical in the order of addresses with a write control signal to be fed to, e.g., the memory circuit 222*a* of the multiplexer, as stated previously.

The controller 242 performs the following operation automatically or only when the output of the button circuit 242 goes low so as to indicate that the moving picture is to be scrambled. The controller 242 produces on the output 354 a read control signal causing the data written to the memory circuit 222*a* from the specific picture of FIG. 15 in the order of slices to be read out in the order of addresses corresponding to the order of slices of FIG. 16. At the same time, the controller 242 produces on the output 356 a synchronizing code indicative of the start of user data and codes representative of the positions of the slices in the vertical direction occurred before and after scrambling.

Assume that the moving picture is scrambled on a macroblock basis. Then, the controller 242 produces on the output 354 a read control signal causing the data written to the memory circuit 222*a* from the specific picture of FIG. 17 in the order of the strings of macroblocks to be read out in the order of addresses corresponding to the order of strings of macroblocks of FIG. 18. At the same time, the controller 242 produces on the output 356 a synchronizing code indicative of user data, codes representative of the positions of the strings in the vertical direction occurred before and after scrambling, and codes representative of the numbers of macroblocks constituting the strings. The outputs 354 and 356 are connected to the corresponding inputs of the multiplexer 222.

In operation, assume that the video camera 3 feeds the NTSC analog luminance signal Y and analog chrominance signals Cr and Cb to the coding device 1 while the button of the button circuit 244 is pressed. Then, the ADC 202 transforms the luminance signal Y and chrominance signals Cr and Cb to digital luminance data Y and chrominance data Cr and Cb, and feeds the digital data to the preprocessor 204. At this instant, the ADC 202 digitizes the luminance signal Y over the period of one scanning line except for a horizontal blanking period with 704 dots, and repeats this over 240 valid scanning lines (for one field). Also, the ADC 202 digitizes each of the chrominance signals Cr and Cb over the above period with 352 dots, and repeats this over the same 240 valid scanning lines as the lines of the luminance signal Y. The preprocessor 204 sequentially receives from the ADC 202 signals having the above dot and scanning line configuration. The preprocessor 204 produces, based on the first and second field of data sequentially input, data constituted by MPEG2 parameters adaptive to NTSC. The resulting MPEG2 data are sequentially delivered to the first frame memory 206 frame by frame (picture by picture). FIG. 13A demonstrates how such data are input to the memory 206 frame by frame. In FIG. 13A, picture types based on the coding system to be executed are shown in the consecutive pictures.

Assume that data B0, B1, I2 and B3 included in a GOP1 shown in FIG. 13A are sequentially written to the first, second, third and fourth frame memories of the memory 206, respectively. Also, assume that the data B0 and B1 read out of the first and second frame memories of the memory 206, respectively, are respectively written to the first and second frame memories of the second frame memory 210 via the first switch 208.

First, the controller 242 causes the data I2 of the GOP1which is to be coded first, to be read out of the third frame memory of the first frame memory 206 on a macroblock basis. The data I2 is applied to one input 330 of the subtracter 214 via the second switch 212. The controller 242 causes the data value "0" to be fed to the other input 332 of the subtracter 214. The subtracter 214 performs subtraction with the two input data values and sends the resulting difference to the DCT circuit 216. The image data represented by the above difference is subjected to intra-frame coding by the DCT circuit 216 and circuitry following it, as will be described hereinafter.

The DCT circuit 216 receives the data from the subtracter 214 on a macroblock basis, divides each macroblock of data into a plurality of blocks of data, performs bidimensional orthogonal transform with the individual block of data, and sends the transformed data to the quantizer 218. The quantizer 218 normalizes the transformed data, i.e., transform coefficients and then delivers them to the variable length coder 220 and dequantizer 226. The coder 220 transforms the normalized transform coefficients to Huffman codes and feeds the Huffman codes to the multiplexer 222. The multiplexer 222 scrambles the data undergone variable length Huffman coding, provides the data with a fixed length, regulates the block-by-block data to a predetermined amount of code, and multiplexes the resulting data at preselected positions shown in FIGS. 19A–21D. In addition, the multiplexer 222 multiplexes the various kinds of attribute signals and information relating to scrambling received from the controller 242 at preselected positions shown in FIGS. 19A–21D. In this case, the multiplexed control signals and the image data are not in a pair due to scrambling. The multiplexed data, i.e., a signal having a frame format conforming to MPEG2 is fed to the transmitter/receiver 4 via the output DOUT of the coding device 1, digitally broadcast via a satellite, and then received. Specifically, the data I2 of the GOP1 shown in FIG. 13B is fed from the device 1 to the transmitter/receiver 4, so that the transmitter/receiver 4 digitally broadcasts the data I2 of the GOP1 shown in FIG. 13C.

On the other hand, the dequantizer 226 multiplies the normalized transform coefficients received from the quantizer 218 by the quantizing coefficients, thereby producing dequantized data. The dequantized data are fed to the inverse DCT circuit 228. The inverse DCT circuit 228 performs bidimensional inverse orthogonal transform with the dequantized data, combines a plurality of blocks to produce a macroblock of data, and delivers the image data to the adder 230 on a macroblock basis. The adder 230 adds each inversely transformed data value and the data value "0" fed via the fourth switch 240, and delivers the sum data to the first predictor 234 via the third switch 232. The predictor 234 stores the sum data sequentially received from the adder 230, i.e., one frame of data I2. At this time, the second predictor 236 has already stored data P8 of a GOP0 preceding the GOP1.

On processing all the data I2 of the GOP1 the controller 242 reads the data B0 to be coded next out of the first frame memory of the memory 210 on a macroblock basis, and causes the data B0 to be input to one input 330 of the subtracter 214 via the second switch 212. At the same time, the controller 242 causes data output from the mean circuit 238 to be input to the other input 332 via the fourth switch 240. The subtracter 214 performs subtraction with the two input data values and delivers the resulting difference to the DCT circuit 216. In this case, the mean circuit 238 delivers to the adder 214 data representative of the mean of the data I2 of the GOP1 and the data P8 of the GOP0 having been stored in the predictors 234 and 236, respectively. Stated another way, the subtracter 214 executes interpolatory interframe prediction coding in order to generate a B picture. When use is made of the data undergone motion correction for the subtraction, the predictor 234 and/or the predictor 236 feeds data representative of motion vectors to the multiplexer 222. The multiplexer 222 multiplexes the motion vectors in the previously stated manner.

The circuitry extending from the DCT circuit 216 to the multiplexer 222 processes the data output from the subtracter 214, as stated earlier. As a result, the data B0 of the GOP1 is fed from the coding device 1 to the transmitter/receiver 4, digitally broadcast from the transmitter/receiver 4, and then received. At this instant, the circuitry extending from the first predictor 234 to the adder 230 does not have to operate. Therefore, the data I2 of the GOP1 and the data P8 of the GOP0 are still left in the two predictors 234 and 236, respectively.

On fully processing the data B0 of the GOP1 the controller 242 reads the data B1 to be coded next out of the second frame memory of the memory 210. The data B1 is fed to one input 330 of the subtracter 214 via the second switch 212. At the same time, the controller 242 causes the data output from the mean circuit 238 to be fed to the other input 332 of the subtracter 214. The subtracter 214 performs subtraction with the two input data values. Difference data output from the subtracter 214 is processed by the circuitry extending from the DCT circuit 216 to the multiplexer 222 in the previously stated manner. Consequently, the data B1 of the GOP1 is delivered from the coding device 1 to the transmitter/receiver 4, digitally broadcast from the transmitter/receiver 4, and then received.

Subsequently, the controller 242 writes data B4, P5, B6, B7 and P8 of the GOP1 in the fifth, sixth, seventh, eighth and ninth frame memories of the first frame memory 206, respectively. Further, the controller 242 writes the data B3 and B4 read out of the fourth and fifth frame memories of the memory 206, respectively, in the first and second frame memories of the secone frame memory 210 via the first switch 208.

First, the controller 242 reads the data P5 of the GOP1 to be coded next out of the sixth frame memory of the memory 206 on a macroblock basis. The data P5 is fed to one input 330 of the subtracter 214 via the second switch 212. At the same time, the controller 242 causes the data output from the first predictor 234 to be fed to the other input 332 of the subtracter 214 via the second switch 212. In this case, the predictor 234 stores the data I2 of the GOP1. The subtracter 214 performs subtraction with the two input data values and feeds image data representative of the resulting difference to the DCT circuit 216. Stated another way, the subtracter 214 executes forward interframe prediction coding for producing a P picture. When use is made of the data undergone motion correction for the subtraction, the predictor 234 feeds data representative of motion vectors to the multiplexer 222.

The data output from the subtracter 214 is processed by the circuitry extending from the DCT circuit 216 to the multiplexer 222 in the previously described manner. The data P5 of the GOP1 is fed from the coding device 1 to the transmitter/receiver 4, digitally broadcast via a satellite, and then received. The data output from the quantizer 218 is processed by the circuitry extending from the dequantizer 226 to the DCT circuit 228 in the previously stated manner and then applied to the adder 230. The adder 230 adds t he data value received from the inverse DCT circuit 228 and the data value received from the first predictor 228 via the fourth switch 240, and delivers the sum data to the second predictor 336 via the third switch 232. As a result, the data P5 of the GOP1 is written to the predictor 236. At this instant, the data I2 of the GOP1 is still left in the predictor 234. The coding device 1 repeats the above coding procedure with the subsequent data B3, B4, P8, B6 and B7. The resulting coded data are also fed from the device 1 to the transmitter/receiver 4 one after another. So long as the scramble mode is not cancelled, data of a GOP2 and successive GOPs will also be sequentially coded in the same manner as the data of the GOIP1.

As stated above, when the controller 242 receives a signal indicative of the scramble mode from the button circuit 244, it reads image data not paired with the control data out of the memory circuit 222*a*. At the same time, the controller 242 outputs information relating to scrambling, i.e., information representative of the scramble mode and information representative of the positions of the individual slice occurred before and after replacement. Alternatively, the controller 242 may output information representative of the scramble mode, information representative of the positions of the individual string of macroblocks occurred before and after replacement, and information representative of the number of macroblocks constituting the individual string, as described previously.

Referring to FIGS. 5 and 6, the expansion reproducing device 2 also embodying the present invention will be described. The reproducing device 2 descrambles and decodes the image data scrambled and decoded by the coding device 1 described with reference to FIGS. 1 and 2. As shown, the reproducing device 2 is made up of a demultiplexer 402, a decoder 404, a dequantizer 406, an inverse DCT circuit 408, an adder 410, a first switch 412, a first predictor 414, a second predictor 416, a mean circuit 418, a second switch 420, a third switch 422, a postprocessor 424, a digital-to-analog converter (DAC), a controller 428, and a descramble button circuit 430.

As shown in FIG. 5, the demultiplexer 402 has an input 114 connected to the input terminal DIN of the reproducing device 2. The signal having the frame format conforming to MPEG2 is fed from the coding device 1 or the transmitter/receiver 4 to the demultiplexer 402. In response, the demultiplexer 402 demultiplexes the multiplexed signal to separate the image data and control data. The separated image data and control data appear on outputs 504 and 506, respectively. This is controlled by a control signal fed from the controller 428 via a control line 508. The outputs 504 and 506 are respectively connected to the input of the decoder 404 and the input of the controller 428. The controller 428 controls the entire device 2 in accordance with the control data 506.

The decoder 404 includes a memory circuit 404*a* for descrambling the scrambled image data received from the multiplexer 402. In the illustrative embodiment, the memory circuit 404*a* is implemented as a DRAM having a capacity great enough to store two frames of data Y, Cb and Cr. The capacity of the memory circuit 404*a* may be great enough to store three or more frames, if desired. A frame memory for storing the data Y, Cb and Cr is constituted by a first and a second frame memory. The coded data Y, Cb and Cr sequentially fed from the demultiplexer 402 in this order are sequentially repeatedly written to the first and second frame memories in this order. In this embodiment, while the data are written to the first frame memory, the data are read out of the second frame memory; while the data are written to the second frame memory, the data are read out of the first frame memory. The writing and reading of data out of such frame memories are controlled by a control signal fed from the controller 428 via a control line 512.

Specifically, assume that image data are sequentially fed from the coding device 1 to the reproducing device 2 via the transmitter/receiver 4 in the order of slices constituting one scrambled picture shown in FIG. 16. Then, the data Y, Cb and Cr demultiplexed by the demultiplexer 402 are sequentially written to the above memories in the order of slices constituting the picture shown in FIG. 16, i.e., C, B, D, A, E, H, G and F and in the order of macroblocks constituting the slices. The data so written to the memories are sequentially read out of the memories in the order of slices constituting the picture shown in FIG. 15, i.e., A, B, C, D, E, F, G and H and in the order of macroblocks constituting the slices. In this manner, the signal is descrambled by being read out in the order of slices different from the order of writing. As a result, the image data sequentially read out and the control signals sequentially input are paired again.

Assume that image data are sequentially fed from the coding device 1 to the reproducing device 2 in the order of strings of macroblocks constituting one scrambled picture shown in FIG. 18. Then, the data Y, Cb and Cr demultiplexed by the demultiplexer 402 are sequentially written to the memories in the order of strings constituting the picture shown in FIG. 18, i.e., B, A, K, J, Q, P, O, N, S, R, U, T, H, F, G, I, E, C, D, M and L, and the order of macroblocks constituting the strings. The data so written to the memories are sequentially read out of the memories in the order of strings constituting the picture shown in FIG. 17, i.e., A, B, C, D, E, F, G, H, I, J, K, L, M, N, O, P, Q, R, S, T and U and in the order of macroblocks constituting the strings. In this manner, the signal is descrambled by being read out in the order of strings different from the order of writing. As a result, the image data sequentially read out and the control signals sequentially input are paired again.

The decoder 404 decodes, under the control of a control signal fed from the controller 428 via a control line 512, the descrambled coded data fed from the memory circuit 404*a* by Huffman decoding. The decoded data appear on an output 510 connected to the input of the dequantizer 406.

The dequantizer 406 multiplies the decoded data (normalized data) fed from the decoder 404 via the signal line 501 by the quantizing coefficients received via a control input 516, thereby producing dequantized data. The dequantized data are delivered to the inverse DCT circuit 408 via an output 514. The dequantization is executed under the control of a signal fed from the controller 428 via the control line 516.

The inverse DCT circuit 408 performs, under the control of a control signal fed from the controller 428 via a control line 520, bidimensional orthogonal transform with the input dequantized data and produces the resulting data on its output 518. The data output from the DCT circuit 408 are fed to the adder 410.

Assume that the data input to the adder 410 are representative of an I picture, i.e., the data have been subjected to intra-frame coding. Then, in the illustrative embodiment, the adder 410 adds to the input data value 518 data value "0" fed from the second switch 420 which will be described. The resulting sum data appear on an output 524. In this case, the pixel data 518 appearing on the input 518 are directly fed out. If desired, the input data 518 may be directly applied to the output 524 without the addition of "0". Assume that data representative of a P picture, i.e., undergone interframe forward coding are input to the adder 410. Then, in the embodiment, the adder 410 adds to the input data value 518 the data value 522 of an I or a P picture received from the first or the second predictor 414 or 416 via the second switch 420. The resulting sum data also appear on the output 524. Further, assume that data representative of a B picture, i.e., undergone bidirectional prediction coding are input to the adder 410. Then, the adder 410 adds to the input data value 519 mean (interpolation) data 522 received from the mean circuit 418 via the switch 420. The resulting sum data also appear on the output 424. Such addition is effected under the control of a control signal 526 fed from the controller 428. The output 524 of the adder 410 is connected to the corresponding inputs of the first and third switches 412 and 422.

The first switch 412 selectively delivers, under the control of a control signal 525 received from the controller 428, the I picture data or the P picture data applied to its input 524 to its output 528 or 534. In the illustrative embodiment, the outputs 528 and 534 are selected alternately. The outputs 528 and 534 are connected to the inputs of the first and second predictors 414 and 416, respectively.

The first predictor 414 includes a memory circuit implemented by a DRAM by way of example. One frame of data representative of one of the I and P pictures are written to the memory circuit. The predictor 414 reads out of its memory circuit the image data on the basis of the vector values input via its input 532, and produces them on its output 530 as a predicted block. The predicted block data are delivered to the adder 410 via the mean circuit 418 and second switch 420. Further, the predictor 414 reads the image data out of the memory circuit and delivers them to the third switch 422 via the output 530 as a final reproduced image block. Such a procedure is controlled by a control signal fed from the controller 428 via the control line 532. The output 530 of the predictor 414 is connected to the corresponding inputs of the mean circuit 418 and switches 420 and 422.

The second predictor 416 is basically identical in configuration with the first predictor 414 and will not be described specifically in order to avoid redundancy. The predictor 416 has its output 536 connected to the corresponding inputs of the mean circuit 418 and switches 420 and 422, and has its control input 538 connected to the corresponding output of the controller 428.

The mean circuit 418 produces a mean (interpolation) of the data received from the two predictors 414 and 416 and corresponding to each other. The resulting mean data appears on an output 540. The operation of the mean circuit 418 is controlled by a control signal received from the controller 428 via a control line 543.

The second switch 420 selectively connects, tinder the control of a control signal 544 fed from the controller 428, one of its four inputs 530, 536, 540 and 542 to its Output 522. Basically, the input 530 or 536 is selected to generate a P picture while the input 540 is selected to generate a B picture. Further, the input 542 is selected to generate an I picture. The output 522 is connected to the corresponding input of the adder 410.

The third switch 422 selectively connects, tinder the control of a control signal 548 fed from the controller 428, one of its three inputs 524, 530 and 536 to its output 546. Basically, the input 530 or 536 is selected to deliver the reproduced data representative of an I picture of a P picture to the postprocessor 424 which will be described. The input 524 is selected to deliver the reproduced data representative of a B picture to the postprocessor 424. The output 546 is connected to the corresponding input of the postprocessor 424.

As shown in FIG. 6, the postprocessor 424 includes a nine-frame memory 424*a* and a signal processing circuit 424*b*. In this embodiment, the memory 424*a* has a capacity great enough to accommodate nine frames of reproduced data. The memory 424*a* sequentially stores the reproduced data received via the input 546. In this case, the reproduced data constitute the MPEG2 frame format. The frame memory 424*a* is made up of a first to a ninth frame memory. The signal processing circuit 424*b* receives the signal of MPEG2 frame format stored in the memory 424*a*, and produces from the received signal data of the same formats as the data fed to the inputs 302, 304 and 306 of the preprocessor 204. As a result, the data Y of the same format as the data fed to the input 302, the data Cr of the same format as the data fed to the input 304, and the data Cb fed to the input 306 appear on outputs 552, 554 and 556, respectively. Such postprocessing is controlled by a control signal fed from the controller 428 via a control line 558. If desired, an arrangement may be made such that the data output from the adder 410 and the data output from the two predictors 414 and 416 are directly applied to the signal processing circuit 424*b* without the intermediary of the frame memory 424*a*.

The DAC 426 receives the data Y, Cr and Cb via its inputs 552, 554 and 556 and transforms them to image signals represented by corresponding analog values. Further, the DAC 426 generates an NTSC video signal based on the transformed signals. The NTSC video signal appear on an output 116. The controller 428 feeds control signals necessary for such DA conversion and including sampling pulses to the DAC 426 via a control line 562.

The reproducing circuit 2 includes the previously mentioned descramble button circuit or switch 430. The operator may press the button included in this circuit 430 in order to descramble the scrambled coded data received from the coding device 1. The circuit 430 has an output 564 which goes, e.g., low when the button is pressed or remains in a high level when it is not pressed.

The controller 428 controls and manages the above various sections of the reproducing device 2 and may advantageously be implemented as a processing system. The controller 428 receives various signals including a signal representative of a macroblock type (MBTYPE) via the control input 506, generates various control signals based on the received signals, and delivers each of the control signals to a particular section.

Particularly, in the illustrative embodiment, the controller 428 performs the following operation automatically or only when the output of the button circuit 430 is in a low level indicating a descramble mode. The controller 428 monitors the UD of the sequence layer sequentially arriving thereat in order to see if it includes the code showing that scrambling has been effected. The controller 428 determines, if such a code is absent, that the GOP has not been scrambled or determines, if the code is present, that the GOP has been scrambled. When the output of the button circuit 430 is in a high level showing that descrambling is not necessary, the controller 428 does not have to monitor the UD of the sequence layer. Therefore, even if the reproducing device 2 receives scrambled coded data from the coding device 1, it does not descramble the received data. The button circuit 430 is omissible if the controller 428 is constructed to constantly monitor the UD of the sequence layer.

In the illustrative embodiment, when the code representative of the execution of scrambling is absent, the controller 428 outputs a read control signal in the order of addresses in which the data are written to the memory circuit 404*a* of the decoder 404. If the above code is present, the controller 428 reads the various multiplexed information following the code. The multiplexed information show the positions of the slices or those of the strings of macroblocks occurred before and after replacement, and the number of macroblocks constituting each slice or each string of macroblocks. The controller 428 generate control signals based on such information and feeds them to the memory circuit 404*a*. More specifically, in this condition, the data identical in number with the macroblocks have been written to the memory circuit 404*a* in the order of addresses before replacement. The controller 428 therefore should only output a control signal for reading the same number of data as the number of macroblocks in the order of addresses before replacement.

When the data are scrambled slice by slice, each slice, of course, consists of a preselected number of macroblocks, e.g., thirty-three in the case of MPEG1 or forthy-four in the case of MPEG2. In this case, the controller 428 should only count a number selected beforehand and does not have to read the information representative of the number of macroblocks. In addition, the coding device 1 does not have to multiplex such information. It is to be noted that even if the code representative of the execution of scrambling is absent, the controller 428 may generate the read control signal for descrambling so long as the information representative of the positions of the slices or those of the macroblocks occurred before and after replacement and the information representative of the number of macroblocks constituting the individual string of macroblocks are available.

With the reproducing device 2 shown and described, it is possible to expand and reproduce the image data compressed and scrambled by the coding device 1 shown in FIGS. 1 and 2. The operation of the reproducing device 2 will be described hereinafter.

Assume that the data are input to the reproducing device 2 from the transmitter/receiver 4 in the specific order shown in FIG. 13C. Then, the data I2 of the GOP1 are input to the device 2 after a sequence header. Also, assume that a signal indicative of the descramble mode is fed from the button circuit 430 of the device 2 to the controller 428. Then, the multiplexer 402 demultiplexes the signal received from the transmitter/receiver 4 into image data and control data. The image data and control data are applied to the decoder 404 and controller 428, respectively. The controller 428 controls the various sections of the device 2 in accordance with the control data. Also, the controller 428, monitoring the UD or control data included in the sequence layer, determines whether or not information representative of the scramble mode is present. Because such information is present in this case, the controller 428 sees that the GOP1 has been scrambled. Subsequently, the controller 428 determines whether or not the above information is followed by information representative of the positions of slices or those of the strings of macroblocks occurred before and after replacement or scrambling, and information representative of the number of macroblocks constituting the individual slice or the individual string of macroblocks. Because these information are also present in this case, the controller 428 decodes the information, generates a read control signal based on the decoded information, and feeds the control signal via its output 512.

On the other hand, the scrambled coded data I2 of the GOP1 and fed from the demultiplexer 402 are written to the memory circuit 404*a* of the decoder 404. The data I2 are read out of the memory circuit 404*a* by the read control signal output from the controller 428 and descrambled thereby. The decoder 404 decodes the data I2 read out by Huffman decoding on a coded data basis. The decoded data are fed from the decoder 404 to the dequantizer 406. The dequantizer 406 multiplies the decoded data by the quantizing coefficients and delivers the resulting dequantized data to the inverse DCT circuit 408. The inverse DCT circuit 408 executes bidimensional orthogonal transform with the input data and delivers the inversely transformed data to the adder 410. The adder 410 adds the input data values and the data value "0" received from the second switch 420. In this case, the sum data output from the adder 410 is fed to the first predictor 414. As a result, the data I2 of the GOP1 are written to the first predictor 414. At this instant, the second predictor 416 has already stored the data P8 of the GOP0.

After the data I2 of the GOP1 have been processed, the scrambled coded data B0 of GOP1 separated by the demultiplexer 402 are written to the memory circuit 404*a* of the decoder 404. The data B0 are read out of the memory circuit 404*a* by a read control signal generated the controller 428. As a result, the data B0 are descrambled in the same manner as the data I2. The decoder 404 decodes the data B0 read out by Huffman decoding on a coded data basis. The decoded data are fed from the decoder 404 to the dequantizer 406. The circuitry extending from the dequantizer 406 to the inverse DCT circuit 408 processes the data B0 in the previously described manner, so that inversely transformed data are fed to the adder 410. The adder 410 adds the data value output from the inverse DCT circuit 408 and the data value received from the mean circuit 418 via the second switch 420. The resulting sum data is delivered to the postprocessor 424 via the third switch 422. Consequently, the data B0 are written to the first frame memory of the postprocessor 424. Because the data B0 are representative of a B picture, they are not written to either the first predictor 414 or the second predictor 416. The data B0 are read out of the first frame memory and fed to the DAC 426. Subsequently, an NTSC video signal is generated on the basis of the data B0 and applied to the monitor 5, so that a picture based on the data B0 appears on the monitor 5.

After the data B0 of the GOP1 have been processed, the scrambled coded data B1 of the GOP1 separated by the demultiplexer 402 are written to the memory circuit 404*a* of the decoder 404. The data B0 are read out of the memory circuit 404*a* by a read control signal generated by the controller 428. As a result, the data B1 are descrambled in the same manner as the data I2. The decoder 404 decodes the data B1 read out by Huffman decoding on a coded data basis. The decoded data are fed from the decoder 404 to the dequantizer 406. Because the data B1 are also representative of a B picture, they are also processed by the circuitry processed by data B0. As a result, the data B1 are written to the second frame memory of the postprocessor 424. The data B1 representative of a B picture are not written either to the predictor 414 or to the predictor 416. The data B1 are read out of the second frame memory and fed to the DAC 426. Subsequently, an NTSC video signal is generated on the basis of the data B1 and applied to the monitor 5, so that a picture based on the data B1 appears on the monitor 5.

Subsequently, the data I2 of the GOP1 stored in the first predictor 414 are read out and written to the third frame memory of the postprocessor 424. The data I2 are read out of the third frame memory and fed to the DAC 426. An NTSC video signal based on the data I2 is applied to the monitor 5 with the result that a picture based on the data I2 appears on the monitor 5.

Next, the scrambled coded data P5 of the GOP1 separated by the demultiplexer 402 are written to the memory circuit 404*a* of the decoder 404. The data P5 are read out of the memory circuit 404*a* by a read control signal generated the controller 428, and are descrambled thereby. The decoder 404 decodes the data P5 read out by Huffman decoding on a coded data basis. The decoded data are fed from the decoder 404 to the dequantizer 406. The circuitry extending from the dequantizer 406 to the inverse DCT circuit 408 processes the data P5 in the previously described manner, so that inversely transformed data are fed to the adder 410. The adder 410 adds the data value output from the inverse DCT circuit 408 and the data value received from the first predictor 414 via the second switch 420. The resulting sum data is delivered to and stored in the second predictor 416. At this instant, the data I2 are still left in the first predictor 414. The subsequent data B3, B4, P8, B6 and B7 are also sequentially decoded by the above procedure. The decoded data are sequentially fed to the postprocessor 424 in the order of B3, B4, P5, B6, B7 and P8. These data are sequentially written to the fourth to ninth frame memories of the postprocessor 424. The data B3–P8 are sequentially read out of the fourth to ninth frame memories and applied to the DAC 426. NTSC video signals based on the data B3–P8 are sequentially generated and applied to the monitor 5. As a result, pictures based on the data B3–P8 sequentially appear on the monitor 5 in the form of a moving picture.

Again, the controller 428, monitoring the UD or control data included in the following sequence layer, determines whether or not information representative of the scramble mode is present. If such information is present, the controller 428 sees that the GOP2 has also been scrambled. Subsequently, the controller 428 determines whether or not the above information is followed by information representative of the positions of slices or those of the strings of macroblocks occurred before and after replacement or scrambling, and information representative of the number of macroblocks constituting the individual slice or the individual string of macroblocks. If these information are present, the controller 428 decodes the information, generates a read control signal based on the decoded information, and feeds the control signal via its output 512. In this case, the device 2 performs sequential descrambling and decoding with the GOP2 in the same manner as with the GOP1 and delivers the reproduced data to the monitor 5 in the order of B0, B1, I2, B3, B4, P5, B6, B7 and P8. Consequently, the monitor 5 sequentially displays pictures based on the above data B0–P8 in the form of a moving picture.

If none of the information relating to scrambling is present in the UD of the sequence layer, the device 2 does not have to descramble received data. Therefore, even if the descramble button of the button circuit 430 is pressed, the controller 428 should only output a read signal identical with the read control signal meant for the memory circuit 404*a*. This allows the moving picture to appear on the monitor 5 faithfully.

In summary, it will be seen that the present invention provides a compression coding device capable of outputting scrambled signals effectively simply by replacing slices or strings of macroblocks constituting a frame or picture. Also, the present invention provides an expansion reproducing device capable of descrambling the scrambled signals effectively to thereby output descrambled image data.

While the present invention has been described with reference to the particular illustrative embodiments, it is not to be restricted by those embodiments. It is to be appreciated that those skilled in the art can change or modify the embodiments without departing from the scope and spirit of the present invention.

What is claim is:

1. A compression coding device for handling a single picture or a preselected plurality of pictures as a single group of pictures, and coding digital image data representative of an individual picture included in the single group of pictures, and having a scrambling function, said device comprising:

coding means for coding the image data representative of the individual picture to thereby output coded image data;

storing means for storing the coded image data output from said coding means;

multiplexing means for multiplexing the coded image data read out of said storing means in a preselected position of an output data format; and control means for controlling said coding means, said storing means and said multiplexing means on the basis of a preselected scrambling system;

wherein the image data representative of the individual picture are divided into a plurality of slices each being subdivided into a plurality of macroblocks; and wherein said control means generates, when writing the coded image data in said storing means, a control signal for writing the coded image data in an order of positions of the slices, from top to bottom as seen on a picture, constituting the individual picture, and feeds said control signal to said storing means, generates, when scrambling the coded image data on the basis of said preselected scrambling system, a control signal for reading the coded image data in an order of the slices different from said order of writing to thereby output scrambled coded image data, feeds said control signal to said storing means to thereby cause said multiplexing means to multiplex the scrambled coded image data fed thereto in the preselected position of the output data format, generates information representative of positions of the slices occurred before and after the scrambling, and feeds said information to said multiplexing means as control data to thereby cause said multiplexing means to multiplex said control data in a preselected position of the output data format.

2. A device as claimed in claim 1, further comprising scramble button circuit means for outputting a scramble command signal, wherein said control means outputs said control signal for reading only when said scramble command signal is input to said control means.

3. A device as claimed in claim 1, wherein said storing means comprises first and second memory means each for storing the coded image data representative of two pictures, and wherein said control means causes, while the coded image data are written to said first memory means, the coded image data to be read out of said second memory means or causes, while the coded image data are written to said second memory means, the coded image data to be read out of said first memory means.

4. A device as claimed in claim 1, wherein said control means further generates information showing that the scrambling has been executed, and feeds said information to said multiplexing means as control data to thereby cause said multiplexing means to multiplex said information in a preselected position of the output data format.

5. A device as claimed in claim 2, wherein said control means further generates information showing that the scrambling has been executed, and feeds said information to said multiplexing means as control data to thereby cause said multiplexing means to multiplex said information in a preselected position of the output data form at.

6. A device as claimed in claim 3, wherein said control means further generates information showing that the scrambling has been executed, and feeds said information to said multiplexing means as control data to thereby cause said multiplexing means to multiplex said information in a preselected position of the output data format.

7. A compression coding device for handling a single picture or a preselected plurality of pictures as a single group of pictures, and coding digital image data representative of an individual picture included in the single group of pictures, and having a scrambling function, said device comprising:

coding means for coding the image data representative of the individual picture to thereby output coded image data;

storing means for storing the coded image data output from said coding means;

multiplexing means for multiplexing the coded image data read out of said storing means in a preselected position of an output data format; and control means for controlling said coding means, said storing means and said multiplexing means on the basis of a preselected scrambling system;

wherein the image data representative of the individual picture are divided into a plurality of slices each being subdivided into a plurality of macroblocks; and wherein said control means generates, when writing the coded image data in said storing means, a control signal for writing the coded image data in an order of positions of the slices as seen on the picture, and feeds said control signal to said storing means, and generates, when scrambling the coded image data on the basis of said preselected scrambling system, a control signal for reading the coded image data out of said storing means at positions of the slices identical with or different from the positions for writing and by varying positions of strings of the macroblocks divided by cut points to thereby output scrambled coded image data, feeds said control signal to said multiplexing means to thereby cause said multiplexing means to multiplex the scrambled coded image data in a preselected position of the output data format, outputs information representative of the positions of the strings of the macroblocks occurred before and after the scrambling and a number of macroblocks constituting an individual string of macroblocks, and feeds said information to said multiplexing means as control data to thereby cause said multiplexing means to multiplex said information in a preselected position of the output data format.

8. A device as claimed in claim 7, further comprising scramble button circuit means for outputting a scramble command signal, wherein said control means outputs said control signal for reading only when said scramble command signal is input to said control means.

9. A device as claimed in claim 7, wherein said storing means comprises first and second memory means each for storing the coded image data representative of two pictures, and wherein said control means causes, while the coded image data are written to said first memory means, the coded image data to be read out of said second memory means or causes, while the coded image data are written to said second memory means, the coded image data to be read out of said first memory means.

10. A device as claimed in claim 7, wherein said control means further generates information showing that scrambling has been executed, and feeds said information to said multiplexing means as control data to thereby cause said multiplexing means to multiplex said information in a preselected position of the output data format.

11. A device as claimed in claim 8, wherein said control means further generates information showing that scrambling has been executed, and feeds said information to said multiplexing means as control data to thereby cause said multiplexing means to multiplex said information in a preselected position of the output data format.

12. A device as claimed in claim 9, wherein said control means further generates information showing that scrambling has been executed, and feeds said information to said multiplexing means as control data to thereby cause said multiplexing means to multiplex said information in a preselected position of the output data format.

13. An expansion reproducing device comprising:

demultiplexing means for receiving a signal containing image data and control data from said multiplexing means included in said compression coding device as claimed in claim 1, and for separating said signal into said image data and said control data;

storing means for storing the image data output from said demultiplexing means;

decoding means for decoding the image data read out of said storing means; and control means for controlling said demultiplexing means, said storing means and said decoding means in accordance with the control data output from said demultiplexing means;

wherein said control means generates, when storing the image data output from said demultiplexing means in said storing means, a control signal for writing the image data in an order of slices representative of an individual picture and each consisting of a plurality of macroblocks, and feeds said control signal to said storing means, and generates, when received information contained in the control data and representative of positions of the slices occurred before and after scrambling, a control signal for reading the image data in the order of the positions of the slices occurred before the scrambling, but from the positions of the slices occurred after the scrambling, and feeds said control signal to said storing means to thereby cause descrambled image data to be output from said storing means.

14. A device as claimed in claim 13, wherein said storing means comprises first and second memory means each for storing the image data representative of two pictures, and wherein said control means causes, while the image data are written to said first memory means, the image data to be read out of said second memory means or causes, while the image data are written to said second memory means, the image data to be read out of said first memory means.

15. A device as claimed in claim 13, further comprising descramble button circuit means for outputting a descramble command signal, wherein said control means outputs said control signal for descrambling only when said descramble command signal is input to said control means.

16. An expansion reproducing device comprising:

demultiplexing means for receiving a signal containing image data and control data from said multiplexing means included in said compression coding device as claimed in claim 4, and for separating said signal into said image data and said control data;

storing means for storing the image data output from said demultiplexing means;

decoding means for decoding the image data read out of said storing means; and control means for controlling said demultiplexing means, said storing means and said decoding means in accordance with the control data output from said demultiplexing means;

wherein said control means generates, when writing said image data output from said demultiplexing means in said storing means, a control signal for writing said image data in an order of slices to be received, and feeds said control signal to said storing means, and generates, only when received information representative of execution of scrambling and contained in said control data output from said demultiplexing means, a control signal for reading the image data in the order of positions of the slices occurred before the scrambling, but from the positions of the slices occurred after the scrambling, and feeds said control signal to said storing means to thereby cause descrambled image data to be output from said storing means.

17. A device as claimed in claim 16, wherein said storing means comprises first and second memory means each for storing the image data representative of two pictures, and wherein said control means causes, while the image data are written to said first memory means, the image data to be read out of said second memory means or causes, while the image data are written to said second memory means, the image data to be read out of said first memory means.

18. A device as claimed in claim 16, further comprising descramble button circuit means for outputting a descramble command signal, wherein said control means outputs said control signal for descrambling only when said descramble command signal is input to said control means.

19. An expansion reproducing device comprising:

demultiplexing means for receiving a signal containing image data and control data from said multiplexing means included in said compression coding device as claimed in claim 7, and for separating said signal into said image data and said control data;

storing means for storing the image data output from said demultiplexing means;

decoding means for decoding the image data read out of said storing means; and control means for controlling said demultiplexing means, said storing means and said decoding means in accordance with the control data output from said demultiplexing means;

wherein said controller generates, when writing the image data output from said demultiplexing means in said storing means, a control signal for writing the image data in an order of strings of macroblocks to he received, and feeds said control signal to said storing means, and generates, when received information representative of positions of the strings of macroblocks occurred before and after scrambling and a number of macroblocks constituting an individual string and contained in said control data output from said demultiplexing means, a control signal for reading the number of macroblocks of the individual string in an order of the positions of the macroblocks occurred before the scrambling, but from the positions occurred after the scrambling, and feeds said control signal to said storing means to thereby cause descrambled image data to be output from said storing means.

20. A device as claimed in claim 19, wherein said storing means comprises first and second memory means each for storing the image data representative of two pictures, and wherein said control means causes, while the image data are written to said first memory means, the image data to be read out of said second memory means or causes, while the image data are written to said second memory means, the image data to be read out of said first memory means.

21. A device as claimed in claim 19, further comprising descramble button circuit means for outputting a descramble command signal, wherein said control means outputs said control signal for descrambling only when said descramble command signal is input to said control means.

22. An expansion reproducing device comprising:

demultiplexing means for receiving a signal containing image data and control data from said multiplexing means included in said compression coding device as claimed in claim 10, and for separating said signal into said image data and said control data;

storing means for storing the image data output from said demultiplexing means;

decoding means for decoding the image data read out of said storing means; and control means for controlling said demultiplexing means, said storing means and said decoding means in accordance with the control data output from said demultiplexing means;

wherein said control means generates, when writing the image data output from said demultiplexing means in said storing means, a control signal for writing the image data in an order of strings of macroblocks to be received, and feeds said control signal to said storing means, and generates, only when received information representative of execution of scrambling and contained in said control data output from said demultiplexing means, a control signal for reading macroblocks of the individual string in an order of the positions of the macroblocks occurred before the scrambling, but from the positions occurred after the scrambling, and feeds said control signal to said storing means to thereby output descrambled image data from said storing means.

23. A device as claimed in claim 22, wherein said storing means comprises first and second memory means each for storing the image data representative of two pictures, and wherein said control means causes, while the image data are written to said first memory means, the image data to be read out of said second memory means or causes, while the image data are written to said second memory means, the image data to be read out of said first memory means.

24. A device as claimed in claim 22, further comprising descramble button circuit means for outputting a descramble command signal, wherein said control means outputs said control signal for descrambling only when said descramble command signal is input to said control means.

* * * * *